Jan. 23, 1968 J. GUTKOWSKI 3,364,822

DATA TRANSMISSION SYSTEMS

Filed Nov. 9, 1964 8 Sheets-Sheet 1

INVENTOR
JANUSZ GUTKOWSKI
BY
Shoemaker and Mattare
ATTORNEYS

Jan. 23, 1968 J. GUTKOWSKI 3,364,822

DATA TRANSMISSION SYSTEMS

Filed Nov. 9, 1964 8 Sheets-Sheet 2

INVENTOR

JANUSZ GUTKOWSKI

BY

Shoemaker and Mattare

ATTORNEY

INVENTOR
JANUSZ GUTKOWSKI
BY
Shoemaker and Mattare
ATTORNEYS

INVENTOR

JANUSZ GUTKOWSKI

BY

Shoemaker and Mattare

ATTORNEYS

Jan. 23, 1968 J. GUTKOWSKI 3,364,822

DATA TRANSMISSION SYSTEMS

Filed Nov. 9, 1964 8 Sheets-Sheet 5

INVENTOR

JANUSZ GUTKOWSKI

BY

Shoemaker and Mattare

ATTORNEYS

FIG. 20
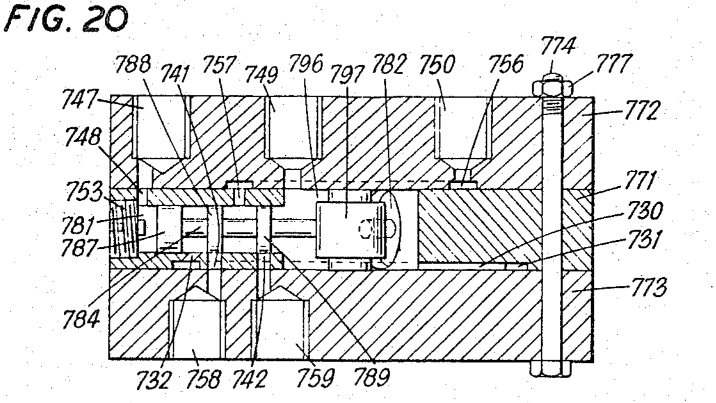
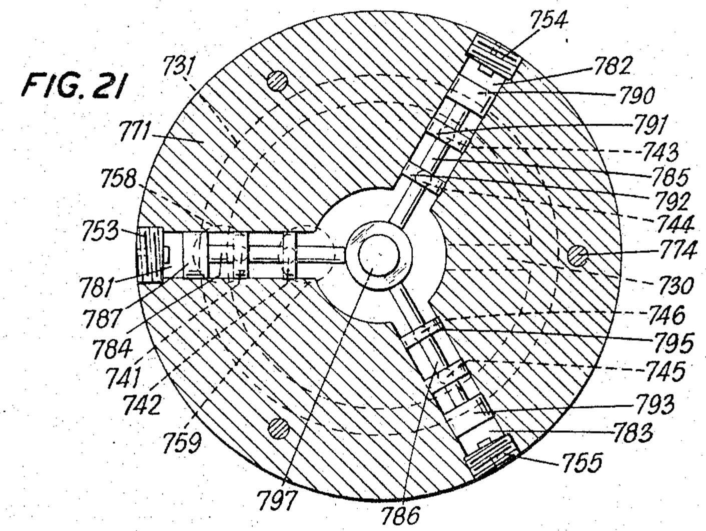
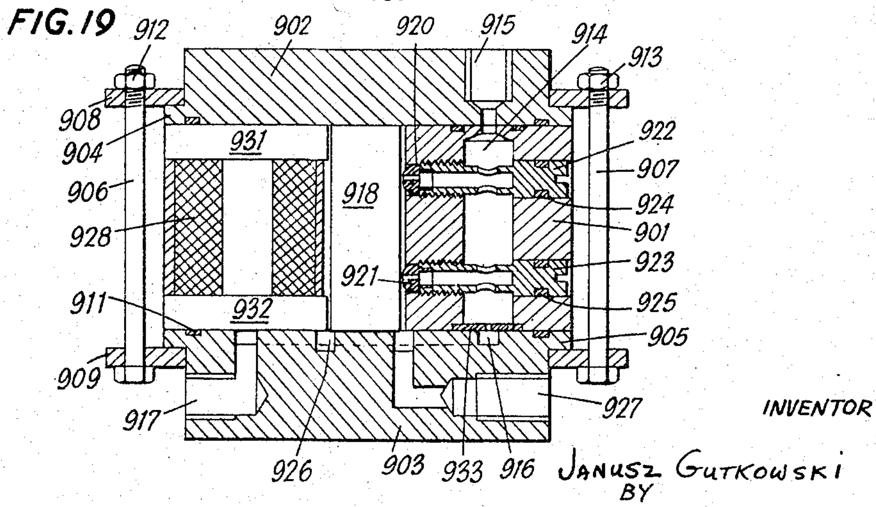
INVENTOR
JANUSZ GUTKOWSKI
BY
Shoemaker and Mattare
ATTORNEYS INVENTOR
JANUSZ GUTKOWSKI
BY
Shoemaker and Mattare
ATTORNEYS Jan. 23, 1968 J. GUTKOWSKI 3,364,822

DATA TRANSMISSION SYSTEMS

Filed Nov. 9, 1964

8 Sheets-Sheet 8

INVENTOR

JANUSZ GUTKOWSKI

BY

Shoemaker and Mattare

ATTORNEYS 3,364,822
DATA TRANSMISSION SYSTEMS
Janusz Gutkowski, 7 Rufus Close, Lewes, Sussex, England
Filed Nov. 9, 1964, Ser. No. 409,880
Claims priority, application Great Britain,
Nov. 20, 1963, 45,751/63
19 Claims. (Cl. 91—413)

This invention relates to data transmission systems of the kind which include an output member and means for controlling the output member in dependence on a plurality of variable quantities. The system may operate, for example, to control the direction of a line or the position of a plane in the output member and the variable input quantities may, for example, be the co-ordinates of a point in a plane or in space. However, the input will generally be of the type which is in, or can be resolved into, polar co-ordinates.

Applications of the invention include automatic power controls, platform stability, gun aiming and missile tracking. It may also be applied to the steering of a vehicle in two freedoms and to the control of machine tools.

It is an object of the invention to provide a novel data transmission system including an output member and means for controlling the output member in dependence on at least two variable input quantities.

It is also an object of the invention to provide a transducer for converting motion of an input member having two degrees of freedom into a plurality of hydraulic output signals.

It is also an object of the invention to provide a transducer for converting a plurality of input signals in the form of variable electrical quantities into a plurality of output signals in the form of variable hydraulic pressures.

It is a further object of the invention to provide an amplifier for amplifying a plurality of signals in the form of hydraulic pressures.

It is also an object of the invention to provide an actuator for use in a data transmission system and capable of converting three signals in the form of hydraulic pressures into the position of a platform in space.

It is also an object of the invention to provide a sensor for detecting the position of an object and producing electrical signals which uniquely define the position of said object.

It is a further object of the invention to provide means for applying the electrical outputs of a sensor to the inputs of a transducer in accordance with the invention.

A system in accordance with the invention is operative to derive a plurality of control signals from the variable input quantities. As has already been stated, the input will generally be of the type which can be resolved into polar co-ordinates and, accordingly, the two input quantities will hereinafter be referred to as a displacement $r$ and an angle $\theta$. The system derives from the two input quantities $r$ and $\theta$, a plurality of signals having the general form $r.\cos(a-\theta)$, $r.\cos(b-\theta)$, $r.\cos(c-\theta)$ and so on. The minimum number of such signals required is two, but in practice it will usually be found that at least three such signals should be used. The signals referred to may, for example, be electric currents or they may be pressures in hydraulic lines.

The letters, $a$, $b$ and $c$ in the expressions given above represent unequal contsant angles and in a practical embodiment of the invention are determined by the geometrical lay-out of the system components. In many cases when three signals are used, it will be convenient to use a symmetrical lay-out and, in this case, the angle $a$ may be, for example, 90° the angle $b$ 210° and the angle $c$ 330°.

The means for converting the polar co-ordinates into the plurality of input signals may, for example, be in the form of a sensor for detecting the polar co-ordinates of a light source and producing a plurality of electrical signals (voltages or current) related to these polar co-ordinates in accordance with the expression given above. Alternative means for converting the polar co-ordinates into the plurality of input signals may, for example, be a transducer having a mechanical displaceable input member controlling the pressures in a plurality of hydraulic lines.

A transducer in accordance with the invention may comprise a plurality of cavities each of which has an inlet port and an outlet port and each of which is in communication with at least one control orifice, a modulator member being adapted to provide variable obstruction of said control orifices.

In a particular embodiment of such a transducer, three cavities are provided each being fed with fluid under pressure from a common supply through a respective restrictor. The three control orifices are disposed symmetrically around a central point being arranged at equal radial distances from said point and at equal angular intervals of 120°. The part of the surface of the modulator which effects the variable obstruction of the control orifices is general symmetrical in form in the plane of the pressure centres of the control orifices. The relationship between the control orifices and the modulator may be based on the geometrical surface of any body of revolution. Thus, one particular configuration may be based on the surface of a cylinder and another particular configuration may be based on a plane surface, but it is to be understood that it is also possible to use any configuration between these two extremes, such as, for example, a conical configuration.

In the first particular configuration, control orifices may be arranged in the wall of a substantially cylindrical chamber which is connected to the low pressure side of the system.

The modulator member is located in the chamber and is also cylindrical in form having a diameter slightly smaller than the diameter of the chamber. The modulator may be moved by the input in any direction perpendicular to its axis within the clearance between the two said diameters. The distance through which the modulator is moved from a position in which it is located in the centre of the chamber represents the displacement $r$, and the direction that this displacement makes with a reference direction perpendicular to the longitudinal axis of the chamber represents the angle $\theta$.

In operation, fluid from the pressure supply passes through the three restrictors, the three cavities and the control orifices into the clearance between the modulator and the walls of the chamber and out to the low pressure line. A balance of pressure forces on the modulator member tends to hold it in a neutral position in the centre of the chamber. In this case, the pressures in the three outlet ports will be of equal magnitude. If a force is exerted on the modulator member at right angles to its longitudinal axis, the modulator member will be moved reducing the clearance between it and at least one of the control orifices and increasing the clearance between it and at least one of the other control orifices. As a result, the flow from the three control orifices is unbalanced, thereby unbalancing the output pressures. The unbalance of the output pressures will be a vectorially unique function of the direction $\theta$ and the magnitude $r$ of the displacement of the modulator member and there will be a range of values of the displacement of the modulator member over which the three output pressures will be related by the expression $r.\sin\theta$, $r.\sin(60°-\theta)$ and $-r.\sin(60°+\theta)$.

In the particular configuration in which the control orifices are arranged in a plane, the obstructing surface of the modulator member is also a plane. In this case, the modulator member is linked at its centre to the member containing the control orifices so as to maintain a basic clearance between the plane of the obstructing surface of the modulator member and the plane containing the control orifices at the centre, while permitting the obstructing surface plane to tilt in any direction relative to the plane of the control orifices, thus varying the degree of obstruction of the individual control orifices.

In operation, fluid under pressure passes through the three restrictors to the three cavities and out of the three control orifices through the clearances between them and the modulator member. Thus, a balance of forces will be created on the modulator member tending to hold it in a neutral position in which the plane of the obstructing surface is parallel to the plane of the control orifices. Under these conditions, the three transducer output pressures will have equal magnitudes. If an input torque is exerted on the modulator member in any plane perpendicular to the plane of the obstructing surface, the modulator member will tilt, thus reducing the clearance between the obstructing surface and at least one of the control orifices and increasing the clearance between the obstructing surface and at least one other of the control orifices. As a result, the flow from the three control orifices will be unbalanced, thereby unbalancing the output pressures. The unbalance will be a vectorially unique function of the direction and angle of displacement of the modulator.

In another form of a transducer in accordance with the invention, the modulator member is formed by a fluid jet nozzle co-operating with a plurality of receivers, the jet nozzle being displaceable from a central position in which it charges all the receivers equally. In the receivers, partial regeneration of pressures will occur according to well-known principles and, accordingly, when the jet nozzle is centrally located between the receivers the pressures in the receivers will all be equal.

A transducer in accordance with the invention for converting a plurality of input signals in the form of variable electrical quantities into a plurality of output signals in the form of variable hydraulic pressures may be based on any of the transducers described above, electromagnetic means being provided to displace the modulator member. The electromagnetic means may include, for example, a cylindrical magnet located between the pole pieces of a plurality of solenoids. Alternatively, the electromagnetic means may include a ring of magnetic material co-operating with one or more permanent magnets and a plurality of solenoids. The ring is magnetised by the permanent magnet, or magnets, so that a plurality of portions of the ring located between the solenoids are exposed to equal and equally-spaced magnetic fields with their polarities identically oriented in relation to the axis of the ring. The ring is rigidly connected to the modulator member of a transducer of any of the types described above and electrical currents are passed through the solenoids. These currents will create related magnetic forces tending to tilt the ring in a direction and with a force uniquely determined by the input currents.

The electrical inputs for a transducer in accordance with the invention may, for example, be derived from a sensor arranged to detect the position of a source of radiation. Such a sensor may include a plurality of photoelectric cells arranged symmetrically around a central point. With such an arrangement, the outputs from the three cells can be caused to respond to displacement of a light source from the axis of the system in such a way that they are related by the general expressions given above, i.e. $r.\cos(a-\theta)$, $r.\cos(b-\theta)$, $r.\cos(c-\theta)$ and so on.

It is desirable that the input currents applied to a transducer in accordance with the invention should be so related that their vector sum is always zero. This requirement can only be met if each one of the currents can be reversed and this is clearly not possible with a sensor of the kind described in the preceding paragraph. Accordingly, the outputs of a sensor in accordance with the invention may be applied to the inputs of a transducer in accordance with the invention by means of a polyhedral bridge circuit. In the case in which there are three inputs to the transducer, the bridge circuit may include means for applying the output signals of the sensor to the input terminals of the transducer in such a way that the potential difference between each pair of input terminals depends on the difference between the outputs produced by two of the photo cells. Such a differential bridge cricuit may, of course, be used with electrical signal generators of different types from the sensor described above. If necessary, the bridge circuit may be arranged to include electrical amplification.

It is to be understood that the vectorial relationship referred to above may apply to changes in the levels of the various inputs and outputs and not to the levels themselves. Thus, the invention includes a system which operates to derive from the two variable quantities $r$ and $\theta$ signals respectively proportional to $r.\cos(a-\theta)+P$, $r.\cos(b-\theta)+Q$, $r.\cos(c-\theta)+R$ and so on. It therefore follows that it is possible to design a system in which the vector sum of the changes in levels is zero even though the vector sum of the signals themselves is not zero and, in this case, provided the constants P, Q, R and so on are sufficiently large it is possible for the signals to be unidirectional. This may simplify amplification and may improve stability and accuracy of control.

Most systems in accordance with the invention will require amplification of the input signals before they can be utilized to actuate an output member. It is a feature of the invention that such amplification should be performed in such a way that the vectorial relationship between the input signals is maintained.

A hydraulic amplifier in accordance with the invention may comprise a plurality of pistons slidable in respective cylinders, control pressures being applied to said pistons in accordance with the values of the input signals. The pistons interact with each other in such a way that the required vectorial relationship is maintained between their displacements in their respective cylinders. This interaction may be obtained, for example, by arranging all the cylinders with their axes contained in a single plane and intersecting in a central point, a radially displaceable member being located in the region of the central point. Alternatively, the central member may be replaced by a ring co-operating with the outer ends of the pistons. Further, it is to be understood that the cylinders may be arranged, for example, with their axes parallel, the interaction being obtained by means of a plate pivoted at its centre. In such an arrangement, the axes are preferably arranged on the surface of a cylinder. Other configurations between the two extremes of the planar and cylindrical arrangements may also be used. For example, the axes of the cylinders may be arranged on the surface of a cone.

In a particular embodiment of such a hydraulic amplifier, three cylinders are provided each containing a valve spool. The axes of the cylinders are contained in a single plane and intersect at a central point, each pair making an angle of 120° at said point. Surrounding said central point is a cavity in which a central member is free to move in any direction contained in said plane. The central member may, for example, be a cylinder, a cone, or a sphere. Each of the valve spools includes a control piston and the three output pressures of a transducer of the particular kind described above may, for example, be applied to said control pistons. The control pressures urge the valve spools towards the central point so that the inner ends of the valve spools bear against the central member. The arrangement is such that when the central member is in a central position, the three valve spools are in a neutral position. Each valve spool is provided with one or more valve pistons which co-operate with valve ports in the respective cylinders to control the application of fluid under pressure to a plurality of hydraulic actuators. If the output pressures from the transducer are unbalanced, the central member of the amplifier will be displaced from its central position to a new position which is a unique vectorial function of the displacement of the modulator member of the transducer. Thus, the geometrical relationship of the displacements of the three valve spools will be a unique vectorial function of the displacement of the modulator member.

A hydraulic amplifier as described above can provide full two-freedom control with the use of two-way valves. Alternatively, full two-freedom control may be effected with the use of four-way valves and double-acting actuators. In this case, only two double-acting actuators are required, the third point in the symmetrical arrangement of the output being a fixed swivelling support. A third freedom may be added to the control action when four-way valves are used in the amplifier by varying the effective diameter of the central member in the amplifier. One practical method of varying this diameter is to have the central member in the shape of a cone to which axial movement is imparted as the means for adding third-freedom control input. A form of effecting final output is to have a platform supported by three symmetrically disposed double-acting hydraulic jacks.

The invention is described herein in terms of three-element symmetry, but it is to be understood that a system in accordance with the invention may be based on the use of more than three signals. Systems so evolved would contain redundant signals and may offer specific additional advantages in specific control applications. An arrangement based on six-element symmetry is particularly suitable for a duplicated control system in which two parallel channels of control are at all times available for a particularly high order of reliability.

Methods of performing the invention will now be described with reference to the accompanying diagrammatic drawings in which:

FIGURE 19 is a sectional side elevation of a further embodiment of a transducer in accordance with the invention;

FIGURE 20 is a sectional side elevation of a further embodiment of a transducer in accordance with the invention;

FIGURE 21 is a plan view partly in section of the cylinder block 771 of FIGURE 20;

Figure 1:
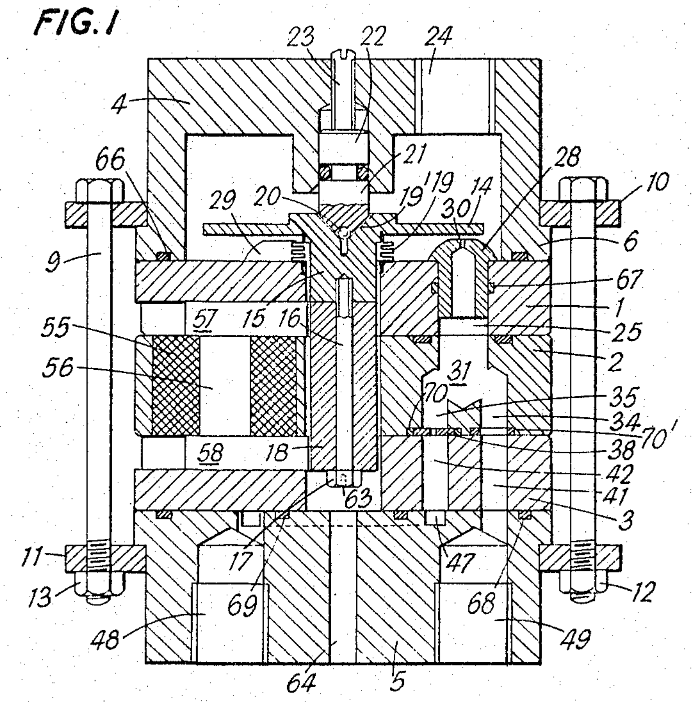
FIGURE 1 is a sectional side elevation of a transducer in accordance with the invention.
Figure 2:
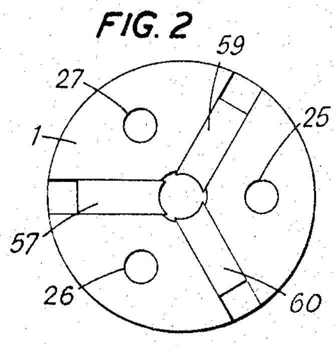
FIGURE 2 is a half-scale underside plan view of the nozzle plate 1 of FIGURE 1.
Figures 3, 4:
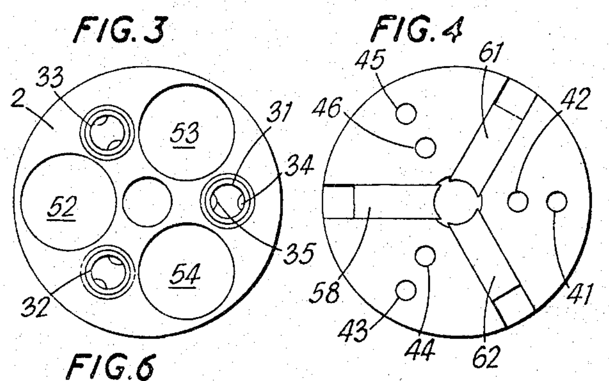
FIGURE 3 is a half-scale plan view of the main plate 2 of FIGURE 1.
FIGURE 4 is a half-scale plan view of the orifice plate 3 of FIGURE 1.

FIGURES 1 to 6 illustrate a transducer in accordance with the invention which is adapted to control the pressures in three hydraulic lines in dependence on an input which may be either in the form of the displacement of a member having two degrees of freedom or in the form of three electrical signals which between them are capable of defining two variable quantities, such as the co-ordinates of a point movable in a surface. If the co-ordinates of a point in the displacement member are $r$ and $\theta$ the pressures in the three hydraulic lines will be respectively proportional to $r.\ \sin\ \theta$, $-r.\ \sin\ (60°+\theta)$ and $r.\ \sin\ (60°-\theta)$. These quantities may also be written as $r.\ \cos\ (90°-\theta)$, $r.\ \cos\ (210°-\theta)$ and $r.\ \cos\ (330°-\theta)$, from which it can be seen that these expressions have the general from $r.\ \cos\ (a-\theta)$, $r.\ \cos\ (b-\theta)$ and $r.\ \cos\ (c-\theta)$ and refer to the particular case in which the angles $a$, $b$ and $c$ are regularly spaced through 360° at 120° intervals.

The transducer illustrated includes a nozzle plate 1, a main plate 2, an orifice plate 3, an upper cover 4 and a lower cover 5. The covers 4 and 5 are provided with shoulders 6 and 7 respectively and the whole assembly is clamped together by means of six bolts, such as those shown at 8 and 9 which pass through holes in rings 10 and 11 engageable with the shoulders on the two covers. The mating surfaces of the various plates and covers are lapped so that fluid-tight joints are formed between them when the retaining nuts such as those shown at 12 and 13 on the bolts such as those shown at 8 and 9 are tightened. In addition, in hydraulic as distinct from pneumatic applications, additional O-ring seals may be a provided in annular passage 47 in the lower cover 5, and the annu-protection against even smallest external leakage.

Located in a space defined by the cover 4 and the nozzle plate 1 is a modulator plate 14 provided with a downwardly extending boss 15 into which is screwed a rod 16. Surrounding the rod 16 and secured thereto by means of a nut 17 is a hollow cylindrical permanent magnet 18. The boss and the magnet are located in a central cavity formed by corresponding holes in the plates 1, 2 and 3. A fluid-tight seal is provided between the boss 15 and the plate 1 by means of a metal bellows 19 which also acts as a pivot bias spring to maintain the modulator plate in contact with the pivot ball and parallel to the plate 1 in the absence of other forces acting thereon. This constitutes what is known as a dry-coil design. The upper surface of the boss 15 is provided with a conical depression 19' in which is located a sapphire ball 20. Bearing against the ball 20 is the lower end of an adjustable bearing member 21. The lower end of the bearing member 21 is generally frusto-conical and is provided with a central spherical depression to engage with the ball 20. The bearing member 21 is slidable in a cylindrical cavity 22 in the centre of the cover 4 and is adjustable by means of a screw 23. The cover 4 is provided with a threaded bore 24 into which may be secured a hydraulic line constituting the return path of the hydraulic circuit of the transducer.

The nozzle plate 1 is provided with three holes 25, 26 and 27 (FIGURE 2) in which are fixed three nozzles such as those illustrated at 28 and 29. Each nozzle defines a central orifice such as that illustrated at 30 and the three orifices face the lower surface of the modulator plate 14.

Figures 5, 6:
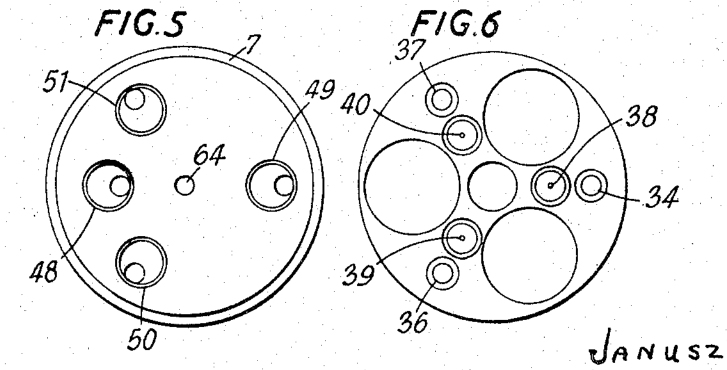
FIGURE 5 is a half-scale underside plan view of the end plate 5 of FIGURE 1.
FIGURE 6 is a half-scale underside plan view of the main plate 2 of FIGURE 1.

The three holes 25, 26 and 27 in the orifice plate 1 communicate, when the apparatus is assembled, with three corresponding cavities 31, 32 and 33 (FIGURE 3) in the main plate 2. Each of the cavities 31, 32 and 33 is divided into two passages at the lower end. The two lower passages of the cavity 31 are indicated by the reference numerals 34 and 35 in FIGURES 1 and 3. One passage of each of the cavities is also shown in FIGURE 6 being indicated by the reference numerals 34, 36 and 37. The other passages of the cavities 31, 32 and 33 are provided at their lowermost ends with restrictors 38, 39 and 40.

The orifice plate 3 is provided with six parallel passages 41, 42, 43, 44, 45 and 46 (FIGURE 4) which communicate with the corresponding passages in the main plate 2.

The three passages 42, 44 and 46 communicate with an annular passage 47 in the lower cover 5, and the annular passage 47 is in turn in communication with a pressure supply port 48. The three passages 41, 43 and 45 communicate respectively with three output ports 49, 50 and 51 in the lower cover 5.

The main plate 2 is provided with three cavities 52, 53 and 54 (FIGURE 3) in which are located three solenoids such as that illustrated at 55 in FIGURE 1. Each solenoid is provided with a central core such as that illustrated at 56, and each core is in contact with upper and lower pole pieces 57 and 58 respectively. The upper pole pieces for the two solenoids located in the cavities 53 and 54 are indicated at 59 and 60 in FIGURE 2. The lower pole pieces for these two solenoids are indicated respectively at 61 and 62 in FIGURE 4.

The lower cover 5 is provided with a central aperture 64 giving access to a threaded counter-bore 63 in the lower end of the shaft 16. If the required input to the system is in the form of a mechanical displacement an extension rod is screwed into the bore 63 and projects downwardly through the aperture 64.

When the transducer is in use, fluid under pressure is fed from a hydraulic pump to the supply port 48, whence it passes through the annular passage 47 to the three cylindrical passages 42, 44 and 46. The fluid leaves the passages 42, 44 and 46 through the respective restrictors 38, 39 and 40 and enters the cavities 31, 32 and 33. Fluid escapes from each of the cavities through a respective one of the nozzles and impinges on the lower surface of the plate 14, thereafter collecting in the space in the cover 4 and being returned to the pump through the vent 24. Each of the output ports 49, 50 and 51 is connected either directly, or through an amplifier, preferably of the kind hereinafter described, to a hydraulic actuator, and the pistons of the actuators may, for example, operate to control the position of a platform. If the required input to the system is in the form of a mechanical displacement, the extension rod is screwed into the counter-bore 63. When the extension rod is located centrally in the aperture 64, the lower surface of the plate 14 is equidistantly spaced from the three nozzles, such as those illustrated at 28 and 29. Under these conditions, the resistance to the escape of fluid through the three nozzles will be the same and consequently the pressures in the three cavities 31, 32 and 33 will be equal so that the pressures applied to the three actuators will also be equal and the platform will be maintained in a reference position which may be, for example, horizontal. Further the fluid impinging on the lower surface of the plate 14 will create a balance of forces tending to hold it in the neutral position in which it is parallel to the plane containing said nozzles. If an external face is applied to the extension rod tending to displace it from the central position, the plate 14 will pivot about the centre of the ball 20 and thus will no longer be equidistantly spaced from the three nozzles. Accordingly, the resistance to the escape of fluid through the orifice in at least one of the nozzles will be increased and the resistance of at least one other of the nozzles will be decreased. As a result the pressures in the three cavities 31, 32 and 33 will be unbalanced and the pressures applied to the actuators will be such as to tilt the platform away from the reference position. The unbalance in the actuator pressures will be a vectorially unique function of the direction and magnitude of the displacement of the extension rod. If the external force is removed, the modulator plate will return to the neutral position under the influence of the balancing forces of the jets of fluid.

In the particular construction shown, cavities 31, 32 and 33 are regularly spaced around the axis of the system, and the three nozzles are arranged at equal radial distances from the said axis and at equal angular intervals at 120°. Accordingly, if displacement of the extension rod is measured in polar co-ordinates $r$ and $\theta$ in the plane of the lower surface of the cover 5 and, if a line in this plane intersecting the axis of the orifice 30 is taken as the reference for measuring $\theta$, the change in spacing between the nozzle 28 and the lower surface of the plate 14 will be proportional to $r.\sin\theta$. Further, the change in spacing between one of the other nozzles and the modulator plate will be proportional to $r.\sin(60°-\theta)$ and the change in the spacing between the third nozzle and the modulator plate will be proportional to $-r.\sin(60°+\theta)$.

Figure 15:
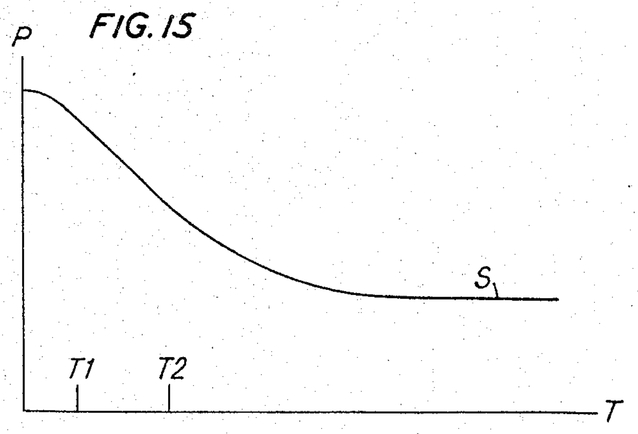
FIGURE 15 is a graph relating to transducers in accordance with the invention.

FIGURE 15 is a graph showing the general form of the relationship between the pressure in one of the cavities such as 31 and the spacing between the modulator plate 14 and one of the nozzles such as those illustrated at 28 and 29. The ordinates in this figure represent the pressure P in one of the cavities such as 31 and the abscissae represent the spacing T between the modulator plate and the corresponding nozzle. It will be clear that when the spacing T is zero, the pressure P is equal to the supply pressure applied to the port 48. The curve S shows that, as the spacing T is increased, there is an increase in the rate at which the pressure in the cavity 31 drops with increasing spacing until a substantially linear range is reached when the spacing is between the values T1 and T2 indicated in the drawing. At the end of the linear range the rate of change of pressure with spacing decreases until the pressure reaches a constant value determined by the ratio of the areas of the orifices in the restrictor 38 and the nozzle 28. Thus, provided the ratio of these two orifice areas is correctly chosen, there will be a range of tilts of the modulator plate over which the output pressure will vary substantially in proportion to the angle of tilt. Thus, over this range of tilts the changes in the pressures in the three output lines will be respectively proportional to $r.\sin\theta$, $-r.\sin(60°+\theta)$ and $r.\sin(60°-\theta)$.

As has already been stated, an electrical input may be provided in place of the mechanical input hereinbefore described. In this case, three electric currents are applied to the three solenoids located in the cavities 52, 53 and 54 to cause a magnetic flux to flow in each case through the solenoid core, the two associated pole pieces and the permanent magnet 18. The forces produced in the air gaps between the pole pieces and the magnet 18 will act together to displace the modulator plate 14 in the same manner as the external force applied to the extension rod as just described. An electric current flowing in one direction in one of the solenoids will magnetise the corresponding pole pieces in such a way that they will attract the magnet 18, whereas a current flowing in the opposite direction will produce a repulsive force between the pole pieces and the magnet. Thus, the pressures in the three output lines will be vectorially related in a predetermined manner to the three input currents, and in the present case in which the three solenoids are regularly spaced around the axis of the system the displacement of the modulator plate will be related to the three input currents in the same manner as the unbalance in the three output lines. The relationship between the input currents and the displacement of the magnet is generally non-linear, but a range of proportionality is obtainable provided the air gaps are small.

The three solenoids should be connected to the outputs of a sensor or amplifier capable of supplying currents that are related in the same manner as the geometrical arrangement of the pole pieces. Thus, if $r$ and $\theta$ represent a desired displacement of the extension rod in polar coordinates, $\theta$ being again measured from a line in the plane of the lower surface of the cover 5 intersecting the axis of the orifice 30, the currents in the solenoids contained in the cavities 52, 53 and 54 must be respectively proportional to $-r.\sin\theta$, $r.\sin(60°+\theta)$ and $-r.\sin(60°-\theta)$, it being understood that a positive current is regarded as one that causes the magnet 18 to be attracted towards the pole pieces of the corresponding solenoid. For example, a positive current in the solenoid 55 will displace the extension rod to the left in the plane of FIGURE 1 (clockwise rotation of the modulator plate about the centre of the ball 20) and this corresponds to a negative displacement of the extension rod along the reference line.

It will be understood that the vector sum of three currents related as above will always be zero and that the attractive and repulsive forces will always assist each other. If the magnetic forces are of the same order as the pressure forces from the nozzles, the modulator will at any instant take up such a position that the unbalance of the pressure forces will be compensated by the resultant of the magnetic forces. Thus pressure changes in the cavities 31, 32 and 33 will be proportional to the electric currents in the solenoids.

It is also to be understood that it is not essential for the currents to be related as above and that the transducer illustrated in FIGURES 1 to 6 may, for example, be utilised to introduce a desired vectorial relationship into the hydraulic outputs which is different from the vectorial relationship of the input currents. Further it is, of course, possible to provide more than one coil in one or more of the cavities 52, 53 and 54 the arrangement being such that the magnetic flux produced in any a pair of pole pieces depends on the sum or difference of the currents in both, or all, of the associated coils.

Figure 7:
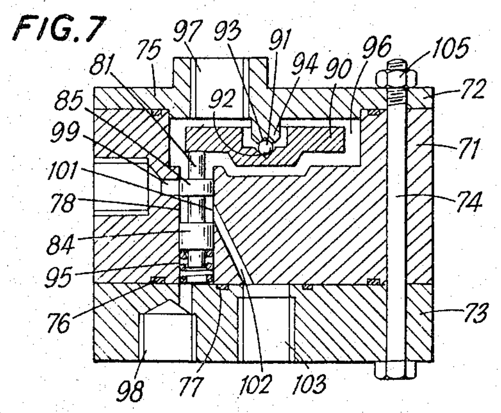
FIGURE 7 is a sectional side elevation of one embodiment of an amplifier in accordance with the invention.
Figure 8:
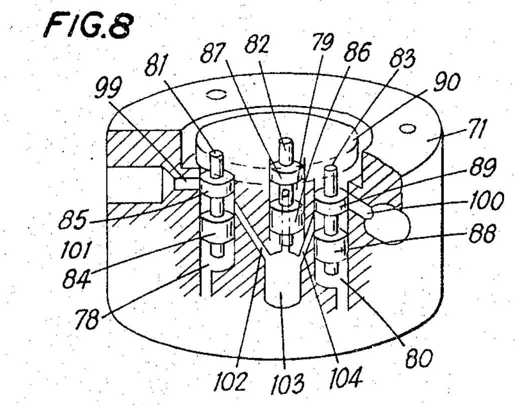
FIGURE 8 is a perspective view of the amplifier illustrated in FIGURE 7.

FIGURES 7 and 8 illustrate a composite hydraulic valve or amplifier in accordance with the invention which is adapted to control the pressures in three hydraulic output lines in dependence on the pressures in three hydraulic input lines. The arrangement of the amplifier is such that the pressures in the three output lines have the same vectorial relationship as the pressures in the input lines. Thus, if the three input lines of the amplifier are constituted by the three output lines of a transducer as illustrated in FIGURES 1 to 6 so that the input pressures are respectively proportional to $r.\sin\theta$, $r.\sin(60°-\theta)$ and $-r.\sin(60°+\theta)$, the pressures in the output lines will also be respectively proportional to $r.\sin\theta$, $r.\sin(60°-\theta)$ and $-r.\sin(60°+\theta)$. It will be recalled that this particular vectorial relationship is equivalent to $r.\cos(a-\theta)$, $r.\cos(b-\theta)$ and $r.\cos(c-\theta)$ in which $a$ equals 90°, $b$ equals 210° and $c$ equals 330°. In other words, the angles $a$, $b$ and $c$ are regularly spaced through 360° at 120° intervals and to maintain the said vectorial relationship the general arrangement of the amplifier illustrated in FIGURES 7 and 8 is also based on a regular disposition of parts of 120° intervals. It is to be understood that, if the vectorial relationship of the input pressures differs from that described, corresponding alterations may be made in the construction of the amplifier.

The amplifier illustrated includes a cylinder block 71, an upper cover 72, and a lower cover 73. The assembly is clamped together by means of three bolts, such as that shown at 74, which pass through corresponding holes in the cover plates and the cylinder block, and corresponding nuts such as that shown at 105. To ensure that the joint between the cover 72 and the cylinder block 71 is fluid-tight, a sealing ring 75 is inserted in a groove in the cylinder block provided for that purpose. Similarly, sealing rings 76 and 77 are provided to ensure that the joint between the lower cover 73 and the cylinder block is also fluid-tight.

The cylinder block 71 contains three cylinders 78, 79 and 80 in which three valve spools 81, 82 and 83 are respectively slidable. The axes of the three cylinders are parallel to the longitudinal axis of the cylinder block and the planes containing the block axis and the axes of the three cylinders are arranged at 120° intervals. Each valve spool includes a control piston which is designated by the reference numeral 84 in the case of the valve spool 81, and by reference numerals 86 and 88 in the case of valve spools 82 and 83 respectively, and a valve piston which is designated by reference numeral 85 in the case of valve spool 81, and by reference numerals 87 and 89 in the case of valve spools 82 and 83 respectively. In each valve spool the diameter of the valve piston is equal to the diameter of the control piston. The upper end of the stem of each valve spool has a spherical radius and bears against a lower flat surface of a balancing plate 90. The balancing plate is located in a cavity 96 in the cylinder block 71 and is free to tilt in any direction about a universal pivot provided by means of a ball 91 seated in spherical depressions 92 and 93 formed respectively in the balancing plate 90 and a downwardly extending boss 94 on the cover plate 72. The spherical upper ends of the stems of the valve spools 81, 82 and 83 are normally held in contact with the balancing plate 90 by means of three identical springs such as that illustrated at 95.

The upper end of each of the cylinders 78, 79 and 80 opens into the cavity 96 which is itself in communication with a threaded bore 97 in the cover 72. The bore 97 is adapted to receive a hydraulic line which constitutes the return path of the hydraulic circuit of the amplifier. The lower end of each of the cylinders 78, 79 and 80 is in communication with a respective one of three control inlets in the lower cover 73 such as that shown at 98 for the cylinder 78.

Each of the cylinders 78, 79 and 80 is provided with an outlet port such as that shown at 99 in the case of the cylinder 78. When the balancing plate 90 is perpendicular to the axes of the three cylinders, the outlet port of each cylinder is substantially closed by a respective one of the valve pistons 85, 87 and 89. The outlet port of the cylinder 80 is not visible in FIGURE 7, but can be seen at 100 in FIGURE 8. Each cylinder is also provided with an inlet port such as that illustrated at 101 in the case of cylinder 78. The three inlet ports communicate through passages such as that shown at 102 with a threaded bore 103 in the lower cover 73. The inlet passage into the cylinder 80 is not visible in FIGURE 7, but can be seen at 104 in FIGURE 8. The threaded bore 103 is adapted to receive a hydraulic line which constitutes the pressure input of the amplifier system.

When the amplifier is in use, fluid under pressure is fed from a hydraulic pump to the bore 103 whence it passes through the three passages such as those illustrated at 102 and 104 to the inlet ports of the three cylinders 78, 79 and 80. If a transducer as illustrated in FIGURES 1 to 6 is being used to provide the amplifier input each of the three control inlets such as that shown at 98 is connected by means of a hydraulic line to a respective one of the output ports 49, 50 and 51 of the transducer. Similarly, each of the outlet ports of the amplifier is connected to a hydraulic actuator and the pistons of the actuators may, for example, operate to control the position of a platform movable about a central pivot. When the three control pressures are equal, all three valve spools will be in the position shown for the spool 78 in FIGURE 7. Thus, all three outlet ports will be symmetrically covered by their respective valve pistons and the pressures applied to the three actuators will be determined by port leakage. Due to the symmetrical coverage of the ports the leakage pressures will all be equal and equal forces will be applied by the three actuators to the platform which will therefore be held stationary by the central pivot. When the inlet pressures are unbalanced, however, at least one of the valve spools will be moved upwards and at least one of the two other valve spools will be moved downwards. As a result, at least one of the outlet ports will be placed in communication with the inlet pressure and at least one other outlet port will be placed in communication with the cavity 96 and thus with the return line of the amplifier system. As a result, fluid under pressure will be introduced into at least one of the actuators and will drain out of at least one other actuator. The consequential movement of the pistons of the actuators will operate to shift the position of the platform.

Co-operation between the upper ends of the three valve spool stems and the balancing plate 90 will ensure that the displacements of the three valve spools are vectorially related in accordance with the geometrical arrangement of the planes containing the longitudinal axis of the amplifier and the axes of the three valve spools. This geometrical arrangement will normally be so arranged in accordance with the vectorial relationship of the input pressures that the direction of the tilt imparted to the balancing plate 90 is angularly related to a reference plane containing the longitudinal axis of the amplifier in the same way as the tilt of the modulator plate 14 is related to a reference plane containing the axis of symmetry of the three cavities 31, 32 and 33 of the transducer. As already stated, the geometrical arrangement used in the amplifier illustrated in FIGURES 7 and 8 is based on a symmetrical distribution with 120° spacing so that is may be used with similarly related output signals from the transducer illustrated in FIGURES 1 to 6. The relative positions of the reference planes in the transducer and the amplifier are determined by the interconnections of the outlet ports 49, 50 and 51 with the three control inlets of the amplifier. For example, if the reference plane in the transducer is assumed to contain the axis of the orifice 30, and if the outlet port 49 is connected to the control inlet 98, the reference plane in the amplifier will contain the axis of the valve spool 81.

Figure 9:
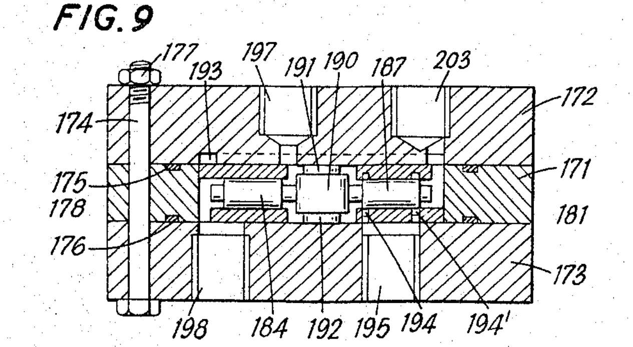
FIGURE 9 is a sectional side elevation of a further embodiment of an amplifier in accordance with the invention.
Figure 10:
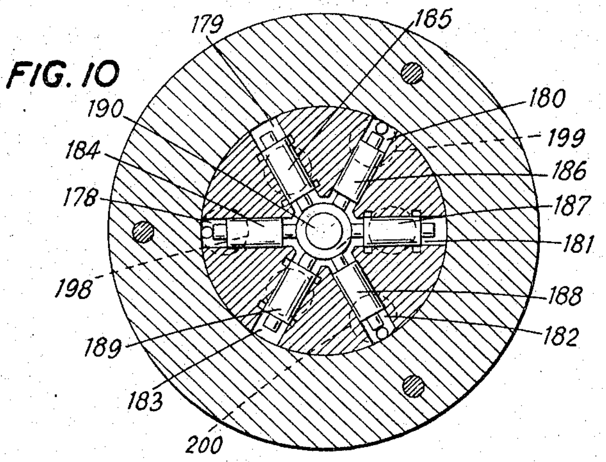
FIGURE 10 is a plan view of the cylinder block 171 of FIGURE 9.

FIGURES 9 and 10 illustrate a modification of the amplifier illustrated in FIGURES 7 and 8 in which the balancing plate 90 is replaced by a central balancing member 190 and in which each of the valve spools 81, 82 and 83 is replaced by a separate control piston and valve piston.

The amplifier illustrated includes a cylinder block 171, an upper cover 172 and a lower cover 173 and the assembly is clamped together by means of three bolts such as that shown at 174 together with co-operating nuts such as that shown at 177. To ensure that the joint between the cover 172 and the cylinder block 171 is fluid-tight, a sealing ring 175 is inserted in a groove in the cylinder block provided for that purpose. Similarly, a sealing ring 176 is provided to ensure a fluid-tight joint between the lower cover 173 and the cylinder block.

The cylinder block 171 includes a central portion containing six cylinders 178, 179, 180, 181, 182 and 183. This central portion is pressed or brazed into an outer ring and the assembly is lapped to ensure that the upper and lower surfaces are parallel. The axes of the six cylinders are contained in a single plane and intersect at a central point about which they are symmetrically disposed at 60° intervals. A line perpendicular to the said plane and passing through the said central point will be regarded as the longitudinal axis of the amplifier. Control pistons 184, 186 and 188 are respectively slidable in the three cylinders 178, 180 and 182. Similarly, valve pistons 185, 187 and 189 are slidable respectively in the three cylinders 179, 181 and 183. Each of the pistons includes a stem and the inner ends of all the stems bear against the outer surface of the central member 190. The central member 190 includes upper and lower extensions 191 and 192 respectively the ends of which are lapped so that they are accurately perpendicular to the axis of the cylindrical portion of the central member and so that the distance between them is slightly less than the thickness of the cylinder block 171. Thus the central member 191 is free to move a short distance in any direction in the plane containing the axes of the cylinders, but its movement in the direction of its longitudinal axis is very limited. Preferably the ends of the stems which bear against the cylindrical surface of the central member 190 are flat, but the outer ends, which act as stops, have spherical radii.

The inner ends of the cylinders open into a central cavity 196 which is itself in communication with a threaded bore 197 in the upper cover 172. The bore 197 is adapted to receive a hydraulic line which constitutes the return path of the hydraulic circuit of the amplifier. The outer end of each of the cylinders 178, 180 and 182 is in communication with a respective one of three control inlets in the lower cover 173 such as that shown at 198 for the cylinder 178. These three control inlets are diagrammatically illustrated in FIGURE 10 at 198, 199 and 200.

The outer end of each of the cylinders 179, 181 and 183 is in communication with an annular chamber 193 formed in the upper cover 172. This annular chamber is itself in communication with a threaded bore 203 in the upper cover 172. This threaded bore is adapted to receive a hydraulic line which constitutes the pressure input of the amplifier system. Each of the cylinders 179, 181 and 183 is also provided with two annular ports such as those shown at 194 and 194' in the case of the cylinder 181. The two annular ports of each cylinder are in communication with threaded bores such as that shown at 195 in the case of the cylinder 181. Each of the three threaded bores such as that shown at 195 is adapted to be connected by means of a hydraulic line to the input of a hydraulic actuator. When the axis of the central member 190 is coincident with the longitudinal axis of the amplifier, the annular ports of the cylinders 179, 181 and 183 are symmetrically covered by the respective valve pistons 185, 187 and 189.

When the amplifier is in use, fluid under pressure is fed from a hydraulic pump to the bore 203 whence it passes through the annular chamber 193 to the outer ends of the three cylinders 179, 181 and 183. If a transducer as illustrated in FIGURES 1 to 6 is being used to provide the amplifier input, each of the three control inlets 198, 199 and 200 is connected by means of a hydraulic line to a respective one of the output ports 49, 50 and 51 of the transducer. When the three control pressures are equal, they will balance each other because of the symmetrical arrangement and there will be no resulting force tending to move the central member. In addition, the pump pressure is applied to the outer ends of the three valve pistons and the pressure in the outer ends of the cylinders 179, 181 and 183 will also be equal. Thus the forces applied by the valve stems to the central member will be balanced and there will be no tendency to move the central member.

If, therefore, the amplifier is used in an open loop servo system, it will be necessary to provide springs in the outer ends of a symmetrical set of three of the cylinders (e.g. the cylinders 279, 281 and 283) to ensure that the central member 109 will be maintained in the position in which its longitudinal axis coincides with that of the amplifier so that the three valve pistons 185, 187 and 189 are maintained in the position illustrated in which they cover the outlet ports of the three cylinders 179, 181 and 183.

If the amplifier is used in a closed loop system, on the other hand, the return springs may not be necessary, since any deviation of the central member from its central position will be automatically corrected by the feedback if there is no command signal input to the transducer. The return springs may, however, be retained in the interest of stability.

When the control pressures are unbalanced, at least one of the control pistons will be moved inwards and at least one of the two other control pistons will be moved outwards. As a result, at least one of the valve pistons will be moved outwards and at least one of the other two valve pistons will be moved inwards. Thus, at least one of the annular ports will be placed in communication with the return path of the hydraulic circuit and at least one other annular port will be placed in communication with the pump pressure. Accordingly, fluid under pressure will be introduced into at least one of the actuators and will drain out of at least one other actuator. If the pistons of the actuators are arranged to control a platform, the consequential movement of the pistons will operate to shift the position of the platform.

Figure 11:
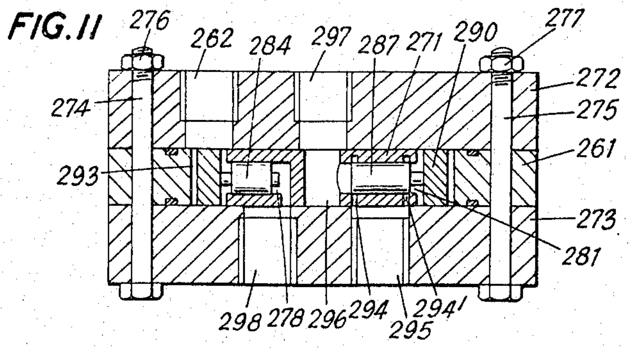
FIGURE 11 is a sectional side elevation of a further embodiment of an amplifier according to the invention.
Figure 12:
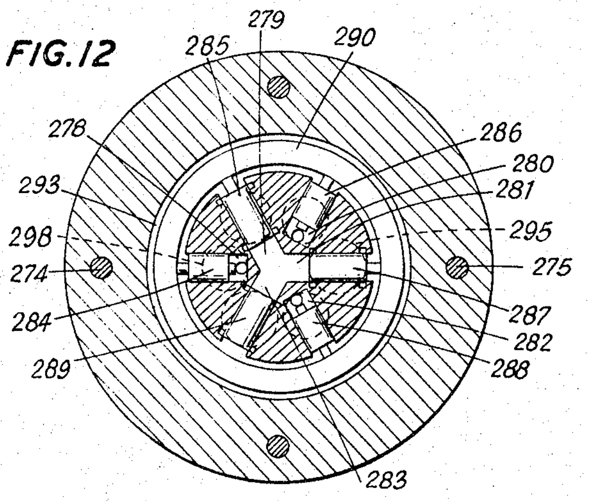
FIGURE 12 is a plan view of the ring 261 and cylinder block 271 of FIGURE 11.

As in the case of the embodiment illustrated in FIGURES 7 and 8, the arrangement illustrated in FIGURES 9 and 10 is designed to operate with control pressures which are vectorially related in the manner described for the outlet pressures of the transducer illustrated in FIGURES 1 to 6. Thus, co-operation between the inner ends of the stems of the three control pistons with the central member 190 will ensure that the displacements of the three control pistons are vectorially related by the expressions $r.\sin\theta$, $r.\sin(60°-\theta)$ and $-r.\sin(60°+\theta)$. The displacements of the valve pistons will be similarly related, but in this case the displacements will be negative unless they are measured in the opposite directions to the control pistons with respect to the longitudinal axis of the system. It is to be understood that radial displacement of the valve piston 187 will be equal and opposite to the radial displacement of the control piston 184 and that this will apply likewise to the control piston 186 and the valve piston 189 and to the control piston 188 and the valve piston 185. It is further to be understood that, since positive (inward) displacement of any control piston (e.g. 184) results in connection of the corresponding output line (e.g. that connected to 195) to the low pressure (return) side of the pump an increase of the pressure on any of the control pistons will result in a decrease in the pressure in the corresponding actuator cylinder. This may be utilised to provide a sense reversal between displacement of the modulator in the transducer and the controlled platform, or, if desired, this sense change may be removed, for example, by suitable construction of the couplings between the actuators and the platform.

bodiment illustrated in FIGURES 9 and 10, the basic FIGURES 11 and 12 illustrate an amplifier in accordance with the invention which is very similar to the em- difference being that the central member 190 is replaced by a ring 290.

The amplifier illustrated includes a cylinder block 271, a ring-shaped spacer 261, an upper cover 272 and a lower cover 273, and the assembly is clamped together by means of four bolts such as those shown at 274 and 275, together with co-operating nuts such as those shown at 276 and 277. As before, sealing rings are provided to ensure fluid-tight joints between the covers and the cylinder block.

The cylinder block 271 contains six cylinders 278, 279, 280, 281, 282 and 283. The axes of these cylinders are again contained in a single plane and again control pistons are provided in three of the cylinders and valve pistons in the remaining three. Thus, control pistons 284, 286 and 288 are respectively slidable in the three cylinders 278, 280 and 282 and valve pistons 285, 287 and 289 are slidable respectively in the three cylinders 279, 281 and 283. Each of the pistons includes a stem and the outer ends of all the stems bear against the cylindrical inner surface of the ring 290. The upper and lower annular faces of the ring 290 are lapped so that they are accurately parallel to the inner faces of the covers 272 and 273, and so that the distance between them is slightly less than the thickness of the cylinder block 271 and the spacer 261, so that the ring is free to move in any radial direction in an annular space 293 defined between the cylinder block and the spacer. The ends of the stems which bear against the inner cylindrical surface of the ring are domed with a radius of curvature less than of the ring.

The inner ends of the cylinders 279, 281 and 283 open into a central cavity 296 which is itself in communication with a threaded bore 297 in the upper cover 272. The bore 297 is adapted to receive a hydraulic line by means of which it is connected to the high-pressure side of a hydraulic pump. The inner end of each of the three cylinders 278, 280 and 282 is in communication with a respective one of three control inlets in the lower cover such as that shown at 298 for the cylinder 278.

The outer ends of all the cylinders are in communication with the annular chamber 293 which is itself in communication with a threaded bore 262 in the upper cover 272. The bore 262 is adapted to receive a hydraulic line connected to the low-pressure side of the hydraulic pump.

Each of the cylinders 279, 281 and 283 is provided with two annular ports such as those shown at 294 and 294' in the case of the cylinder 281. The two outlet ports of each cylinder are in communication with a threaded bore such as that shown at 295 in the case of the cylinder 281. Each of the three threaded bores such as that shown at 295 is adapted to be connected by means of a hydraulic line to the input of a hydraulic actuator. When the axis of the ring 290 is coincident with the axis of the cylinder block 271, the outlet ports of the cylinders 279, 281 and 283 are equally covered by the respective valve spools 285, 287 and 289.

When the amplifier is in use, fluid under pressure is fed from the hydraulic pump to the inlet 297, whence it passes to the inner ends of the three cylinders 279, 281 and 283. If a transducer as illustrated in FIGURES 1 to 6 is used to provide the amplifier input, each of the control inlets such as that shown at 298 is connected to a respective one of the output ports 49, 50 and 51 of the transducer. As in the case of the amplifier illustrated in FIGURES 9 and 10, there will be no resulting force tending to move the ring 290 when the three control pressures are equal. Thus similar considerations concerning the provision of springs in at least three of the cylinders will again apply in accordance with the type of system in which the amplifier is being used.

When the control pressures are unbalanced, at least one of the control pistons will move outwards and at least one of the two other control pistons will be moved inwards. As a result at least one of the valve pistons will be moved inwards and at least one of the two other valve pistons will be moved outwards. Thus, at least one of the outlet ports will be placed in communication with the low-pressure side of the hydraulic pump and at least one other outlet port will be placed in communication with the high-pressure side of the pump. Accordingly, fluid under pressure will be introduced into at least one of the actuators and will drain out of at least one of the other actuators. The consequential movement of the pistons of the actuators will operate to shift the position of the platform. As in the previously described embodiments, co-operation between the outer ends of the valve piston stems with the inner cylindrical surface of the ring 290 will ensure that the displacements of the three valve pistons are vectorially related in accordance with the symmetrical disposition of the cylinders.

Figure 13:
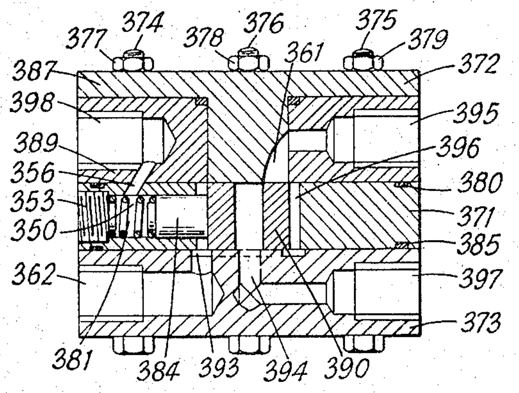
FIGURE 13 is a sectional side elevation of a further embodiment of an amplifier in accordance with the invention.
Figure 14:
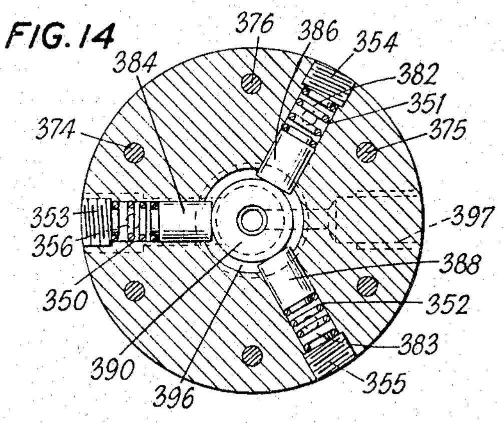
FIGURE 14 is a plan view of the cylinder block 371 of FIGURE 13.

FIGURES 13 and 14 illustrate a further modification of the amplifier illustrated in FIGURES 9 and 10, the major difference in this case being that the functions of the valve spools 185, 187 and 189 are performed by the central member itself.

The amplifier illustrated includes a cylinder block 371, an upper cover 372 and a lower cover 373. The assembly is clamped together by means of six bolts such as those shown at 374, 375 and 376 together with co-operating nuts such as those shown at 377, 378 and 379. A sealing ring 380 is provided in a groove in the upper surface of the cylinder block to ensure that there is a fluid-tight joint between the upper cover 372 and the cylinder block whilst a similar sealing ring 385 ensures a fliud-tight joint between the cylinder block and the lower cover.

The upper cover 372 is made up from two separate integers one of which is a member 387 which is T-shaped in cross-section and the other of which is a ring-shaped member 389. The member 387 consists of hard steel and three slots such as that shown at 361 are milled in the downward extension of this member at 120° intervals around the periphery of this extension. The ring-shaped member 389 also consists of hard steel and is provided with six threaded bores such as those shown at 395 and 398. The two members are copper brazed together to form the composite upper cover, the hardening temperature of the steel and the brazing temperature preferably being so chosen that these two processes can be carried out in a single operation. The two members are lined up so that three of the threaded bores such as that illustrated at 395 communicate with the three slots such as that shown at 361. After the two members have been brazed together, the lower surface is lapped to ensure that it is strictly parallel to the upper surface of the cylinder block 371.

The cylinder block 371 contains three cylinders 381, 382 and 383. The axes of these cylinders are contained in a single plane and intersect at the centre of the cylinder block. Pistons 384, 386 and 388 are slidable respectively in the three cylinders 381, 382 and 383. The cylinder block 371 also includes a central cavity 396 containing the central member 390. The upper and lower surfaces of the central member 390 are lapped so that they are accurately parallel to the inner faces of the covers 372 and 373 and so that the distance between them is only very slightly less than the thickness of the cylinder block 371. The inner ends of the pistons 384, 386 and 388 are flat and are held in contact with the outer cylindrical surface of the central member 390 by means of respective springs 350, 351 and 352.

The cylinders 381, 382 and 383 are formed by drilling the cylinder block radially inwards and the outer ends of the cylinders are thereafter closed and sealed by means of respective plugs 353, 354 and 355. In addition, three holes such as that shown at 356 are drilled downwardly from the upper surface of the cylinder block to provide communication between the outer end of each of the cylinders 381, 382 and 383 and a respective one of the threaded bores such as that shown 398.

The lower cover 373 is provided with two threaded bores 362 and 397. The bore 362 communicates with an annular groove 393 in the upper surface of the cover. This groove places the bore 362 in communication with the central cavity 396 in the cylinder block. The bore 397 is in communication with a hole 394 in the centre of the upper surface of the lower cover. This hole communicates with the interior of the central member 390.

When the amplifier is in use, fluid under pressure is fed from the hydraulic pump to the pressure inlet 397 whence it passes to the interior of the cylindrical central member 390. If a transducer as illustrated in FIGURES 1 to 6 is used to provide the amplifier input, each of the control inlets such as that shown at 398 is connected to a respective one of the output ports 49, 50 and 51 of the transducer. The bore 362 is connected to the low pressure side of the hydraulic system and each of the three output ports such as that shown at 395 is connected to the input of a respective hydraulic actuator.

When the pressures applied to the three control inlets are equal the three springs will hold the central member 390 in the position shown in the drawings in which the lower end of each of the slots such as that shown at 361 is covered by the upper annular face of the central member 390. Under these circumstances, only the normal leakage fluid can enter or leave any of the three hydraulic actuators. When the pressures in the control inlets are unbalanced, at least one of the pistons will move inwards and at least one of the two other pistons will move outwards. If it is assumed, for example, that the piston 384 moves inwards, the central member 390 will be moved to the right in the plane of FIGURE 13 and as a result the bore 395 will be placed in communication through the central passage in the member 390 with the pressure input 397. At the same time, at least one of the two outlet ports that are connected to hydraulic actuators will be placed in communication with the return path 362. Thus, hydraulic fluid under pressure will enter at least one of the actuators and drain out of at least one of the other actuators.

In the other embodiments of the invention illustrated in FIGURES 7 to 12 of the drawings, the required vectorial relationship between the variations in the output pressures was maintained by co-operation of the stems of valve pistons with either an internal or an external circular cylindrical surface. In the embodiment illustrated in FIGURES 13 and 14, the same result is achieved by using a single cylindrical member of annular cross-section to co-operate with three slots so that three sectors of the cylindrical member act as three valve pistons and are automatically moved together in such a way that the valve openings always have the required vectorial relationship. Thus, for example, it can be seen that neglecting any port overlap that may be provided for practical reasons, if the central member is moved to the right in the plane of FIGURE 13 so that the distance between the lower inner edge of the slot 361 and the upper inner edge of the central member 390 is $x$ cm., the distance between the upper outer edge of the central member 390 and the lower outer edge of each of the other two slots will be $x/2$ cm. Thus, the area of the valve opening connecting one of the actuator pistons to the pump pressure will be equal to the sum of the valve opening areas connecting the other two pistons to the hydraulic system return.

This will be true for any direction of displacement in any system of the kind described in which the slots are symmetrically arranged in a circle around the central member.

Figure 16:
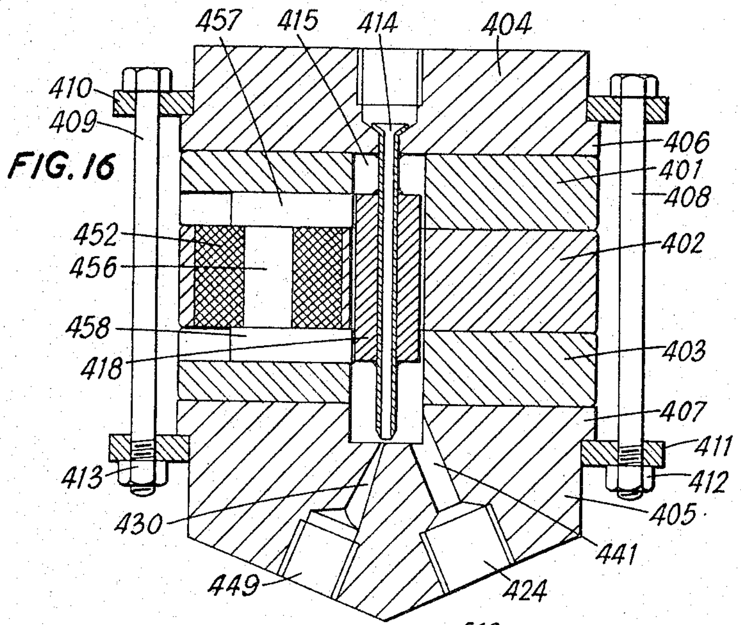
FIGURE 16 is a sectional side elevation of a further embodiment of a transducer in accordance with the invention.

FIGURE 16 illustrates a transducer in accordance with the invention which utilises an electromagnetic control arrangement similar to that used in the transducer illustrated in FIGURES 1 to 6, but in which the method of controlling the hydraulic output pressures is fundamentally different. The transducer is again illustrated with a symmetrical distribution of the solenoids at 120° intervals and with a corresponding arrangement of the hydraulic outputs, but it is, of course, to be understood that the number and distribution of the inputs and outputs may be varied in accordance with the particular requirements of the system in which the transducer is to be used.

The transducer illustrated in FIGURE 16 includes an upper plate 401, a main plate 402, a lower plate 403, an upper cover 404 and a lower cover 405. The covers 404 and 405 are provided with shoulders 406 and 407 respectively and the whole assembly is clamped together by means of six bolts such as those shown at 408 and 409 which pass through the holes in rings 410 and 411 engageable with the shoulders on the two covers. The mating surfaces of the various plates and covers are lapped so that fluid-tight joints are formed between them when the retaining nuts such as those shown at 412 and 413 are tightened. In addition, in hydraulic applications O-ring seals may be provided in annular grooves between the mating surfaces to give extra protection against external leakage.

The cover 404 is provided with a centrally threaded bore 448 adapted to be connected to the high pressure side of a hydraulic pump. The upper end of a capillary jet tube 414 is fitted in a further central hole drilled in the lower part of the cover 404, the arrangement being such that the interior of the tube is in communication with the bore 448. The tube 414 is made from spring-quality material and may be welded, soldered or bonded with resin into the cover 404. The tube 414 extends downwardly in a cavity 415 formed in the upper, main and lower plates and in part of the lower cover 407. Secured to the middle portion of the tube 414 is a permanent magnet 418 which co-operates with upper and lower pole pieces of three solenoids. Each solenoid is provided with a central core such as that illustrated at 456 and a coil such as that illustrated at 452. Each core is in contact with the upper and lower pole pieces such as those illustrated at 457 and 458. The pole pieces project inwardly into the cavity 415 leaving only a small gap between them and the magnet 418.

An orifice in the lower end of the tube 414 co-operates with three generally conical fluid receivers such as that shown at 430. The narrower ends of the three fluid receivers open into the cavity 415, these openings being arranged at 120° intervals and being as close together as is practicable. The axes of the receivers are as nearly parallel as will permit them to communicate with three threaded bores such as that shown at 449.

A drain 441 is also provided at the lower end of the cavity 415 and this drain communicates with a further threaded bore 424 which is adapted to be connected to a hydraulic line which constitutes the return path of the transducer hydraulic system. When the transducer is in use, fluid under pressure is fed from a hydraulic pump to the supply port 448 whence it passes through the jet tube 414 and leaves through the orifice in the lower end thereof. Each of the output ports such as 449 is connected either directly or through an amplifier, for example of the kind illustrated in FIGURES 7 and 8, 9 and 10, 11 and 12 or 13 and 14, to a hydraulic actuator, and the pistons of the actuators may, for example, operate to control the position of a platform. The jet of fluid leaving the orifice in the jet tube enters one or more of the openings in the three receivers at the base of the cavity 415 and the pressure in each of the receivers will depend on the position of the jet tube in relation to the receiver openings. The divergent conical shape of each receiver improves the efficiency of the conversion of the kinetic energy of the jet into pressure energy in the receivers.

If the three electric currents applied to the three solenoids are equal, the forces in the air gaps between the pole pieces and the magnet 418 will be equal and there will be no resultant force tending to displace the magnet. Accordingly since the tube 414 is made of spring material and is secured at its upper end into the upper cover 404, it will under these conditions centralise itself with the jet from the lower orifice dividing equally between the three receivers. If, however, the currents in the three solenoids are unbalanced, the magnet 418 will be displaced from its central position between the pole pieces with the result that the jet will charge at least one of the receivers more than at least one of the other receivers. As a result the pressure in at least one of the output lines will be increased and the pressure in at least one of the other output lines will be decreased. The unbalance in the pressure in the output lines will be a vectorially unique function of the direction and magnitude of the displacement of the jet tube which will itself be determined by the electric currents flowing in the three solenoids. The relationship between the displacement of the jet tube and each of the output pressures is again of the general form illustrated in FIGURE 15, so that a range of proportionality is obtained. As in the case of the embodiment illustrated in FIGURES 1 to 6, the three solenoids should be connected to the output of a sensor or electric amplifier capable of supplying currents that are related in accordance with the geometrical arrangement of the pole pieces.

Figure 17:
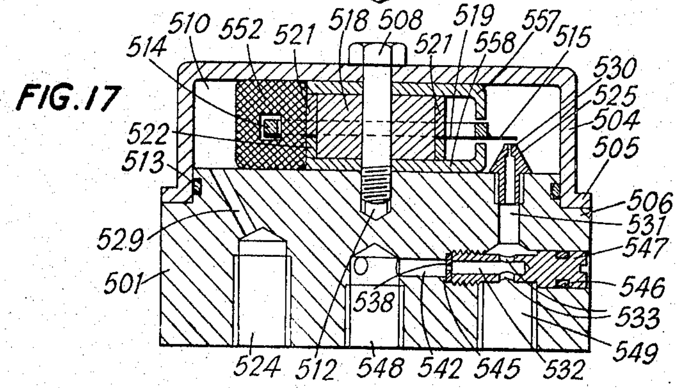
FIGURE 17 is a sectional side elevation of a further embodiment of a transducer in accordance with the invention.
Figure 18:
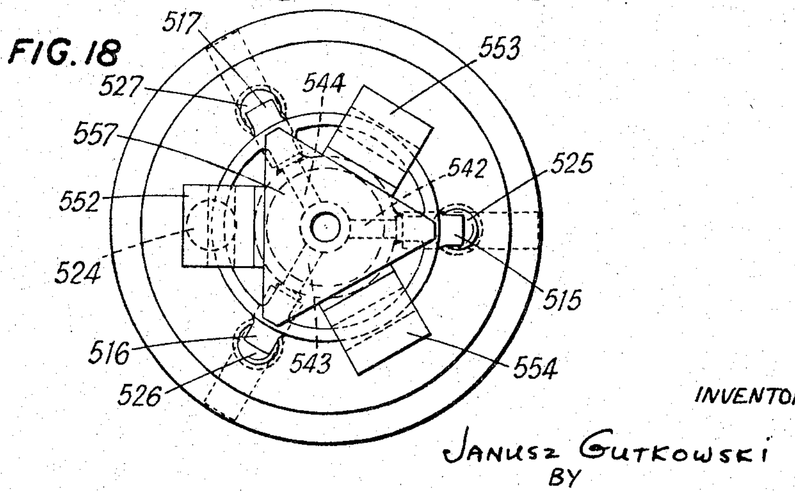
FIGURE 18 is a plan view of the nozzle plate 501 of FIGURE 17.

FIGURES 17 and 18 illustrate a further embodiment of the invention which resembles that illustrated in FIGURES 1 to 6 except in the manner in which the modulator plate is controlled by the three solenoids. As in the case of FIGURE 16, it must be understood that the symmetrical arrangement illustrated with three solenoids is only an example of the many possible arrangements which can be adopted in accordance with the invention.

The transducer illustrated in FIGURES 17 and 18 includes a nozzle plate 501 and a cover 504. The nozzle plate 501 is provided with a shoulder 506 aaginst which a flange 505 on the cover 504 is pressed by means of a bolt 508 extending through the centre of the cover into a threaded bore 512 in the nozzle plate. An O-ring 513 is provided in a channel in the nozzle plate to ensure that the joint between the cover and the nozzle plate is fluid-tight.

Screwed into the lower surface of the nozzle plate 501 are three nozzles 525, 526 and 527. Each of the nozzles has a central orifice such as that illustrated at 530 and each communicates with a cavity such as that shown at 531. The lower ends of the three cavities such as 531 communicate respectively with three threaded bores such as that illustrated at 549 which constitute the three hydraulic outputs of the system. A further threaded bore 548 is provided in the centre of the lower surface of the nozzle plate 501 and this bore is adapted to be connected to a hydraulic line communicating with the high pressure side of a hydraulic pump. Three radial bores 542, 543 and 544 connect the central bore 548 to the three corresponding outputs such as 549. A plug such as that illustrated at 547 is screwed into each of the radial bores and is sealed by means of an O-ring such as that illustrated at 546. Three shoulders such as that illustrated at 545 are provided in the three radial bores and a restrictor such as that shown at 538 is held against each of these shoulders by means of the respective plug. Each of the plugs has a central passage such as that shown at 532 which communicates with the respective output and cavity such as 531 through a series of holes 533.

The nozzle plate 501 is provided with a further threaded bore 524 which is adapted to be connected to a further hydraulic line constituting the return path of the transducer hydraulic system. The threaded bore 524 communicates through a passage 529 with a space 510 defined by the cover 504.

Located in the space 510 are three solenoids 552, 553 and 554. Each solenoid is wound around an internal passage and a ring armature 514 passes through all the solenoids being free to move up and down within each solenoid. The ring 514 is supported by a flat spring 519 consisting of non-magnetic material. The spring 519 may be soldered, bonded, riveted or welded to the ring 514. The spring 519 is clamped between the bushes 521 and 522 said bushes also being made of non-magnetic material. Located within the bushes and the spring 519 is a permanent magnet 518 the magnetic axis of which coincides with the axis of the bolt 508. Co-operating with the magnet 518 are two substantially triangular pole pieces 557 and 558. As can be seen from FIGURE 17, the three corners of each of the triangular pole pieces are turned inwardly to define small air gaps between them and the ring 514. The ring 514 is provided with three extensions 515, 516 and 517 which co-operate respectively with the three nozzles 525, 526 and 527. These extensions may be fitted to the ring by any desired means such, for example, as welding and preferably consist of rigid material. To enable the ring 514 to pass through the solenoids it may be built up from two or three separate pieces joined together in situ when the spring 519 and the extensions 515, 516 and 517 are attached. Alternatively it may be formed from a coil of strip material fed in one continuous length to form a flat helix the turns of which are bonded together.

When the transducer is in use, fluid under pressure is fed from a hydraulic pump to the supply port 548 whence it passes through the three passages 542, 543 and 544 which it leaves through the three respective restrictors such as that shown at 538. In each case it then passes through the central passage in the plug, out through the holes in the plug and into the respective cavity such as that shown at 531. Fluid escapes from each of the cavities through the respective one of the nozzles and impinges on the corresponding armature ring extension 515, 516 or 517. The escaping fluid collects in the space 510 and drains through the passage 529 to the return side of the hydraulic system of the transducer.

If all the extensions 515, 516 and 517 are equally spaced from their respective nozzles 525, 526 and 527, the resistance to the escape of fluid through the three nozzles will be the same and consequently the pressures in the three cavities such as that shown at 531 will be equal, so that the pressures in the three outlet ports such as 549 will also be equal. Since the extensions 515, 516 and 517 are rigidly secured to the armature ring 514 the fluid impinging on the lower surface of each of the extensions will create a balance of forces on the ring tending to hold it in the neutral position in which its median plane is parallel to the plane containing the orifices of the three nozzles.

If electric currents are supplied to the three solenoids 552, 553 and 554, three north and three south poles will be produced around the ring 514. Thus, the portions of the ring between the various pole pieces such as 557 and 558 will have a magnetic polarity depending on the magnitudes and directions of the currents in the solenoids. Thus, for example, if the magnitudes and directions of the currents in the solenoids 553 and 554 are such that a north pole is produced in the ring between the pole pieces 557 and 558 and if the north pole of the magnet 518 is in contact with the pole piece 557, the ring will be deflected towards the pole piece 558. The directions in which the solenoids are wound and the interconnections of the solenoids will be such that, when the three input currents are equal, the magnetic forces will be balanced so that there will be no deflection of the ring. The input currents should be arranged so that their vector sum is zero and if this is done, then the sum of the flux densities at any three points in the ring, spaced 120° apart, will also always be zero. In this case, deviation of the ring 514 from its position parallel to the plane of the nozzles will cause the resistance to the escape of fluid through one of the nozzles to be increased and the resistance to the escape of fluid through at least one of the other nozzles to be decreased. As a result, the pressures in the three cavities such as 531 will be unbalanced and there will be a similar unbalance in the three output pressures. The unbalance in the output pressures will be a vectorially unique function of the unbalance in the three input currents to the solenoids.

FIGURE 19 illustrates a further transducer in accordance with the invention which is again designed to control the pressures in three hydraulic lines in dependence on an input in the form of three electrical signals which are respectively proportional to $r. \sin \theta$, $-r. \sin (60°+\theta)$ and $r. \sin (60°-\theta)$. The transducer illustrated includes a main plate 901, an upper cover 902 and a lower cover 903. The covers 902 and 903 are provided with shoulders 904 and 905 respectively and the whole assembly is clamped together by means of six bolts such as those shown at 906 and 907 which pass through holes in rings 908 and 909 engageable with the shoulders on the two covers. Sealing rings 910 and 911 are provided to ensure fluid-tight joints between the covers and the main plate when the retaining nuts such as those shown at 912 and 913 are tightened.

Located in the main plate are three cavities such as that shown at 914. These are symmetrically arranged in the plate at intervals of 120°. Each of the cavities extends from the upper surface of the main plate where it communicates with a respective one of three bores in the upper cover such as that shown at 915. The three threaded bores such as that shown at 915 constitute the hydraulic outputs of the transducer. The lower end of each of the cavities communicates with an annular groove 916 in the upper surface of the lower plate 903 through a restrictor such as that shown at 933. This annular groove is itself in communication with a threaded bore 917 which is adapted to be connected to the output of a hydraulic pump.

Located in a central space extending from the upper to the lower surface of the main plate is a permanent magnet 918. The upper and lower ends of this magnet are lapped so that they are accurately parallel to the corresponding surfaces of the upper and lower covers and so that the distance between them is slightly less than the height of the plate. Thus, when the transducer is assembled, the magnet 918 is free to move in the central space in any radial direction. An annular groove 926 is provided in the upper surface of the lower plate 903 and serves to place the central space in the plate 901 in communication with a threaded bore 927 which is adapted to receive a line constituting the hydraulic return of the transducer system.

A pair of radial holes are drilled through the plate 901 to intersect each of the cavities. Each of the holes is provided with a shoulder near its inner end and a nozzle such as those shown at 920 and 921 is held against the respective shoulder by means of a plug such as those shown at 922 and 923. The plugs are sealed in the holes by means of O-rings such as those shown at 924 and 925. Each plug is provided with a central bore communicating with the hole in the associated nozzle and also communicating through a plurality of further holes with the interior of the respective cavity.

The main plate 901 is provided with three further cavities located between the three cavities such as 914. Three solenoids such as that illustrated at 928 are located in these three further cavities and each solenoid is provided with a central core such as that illustrated at 930. Each core is in contact with upper and lower pole pieces such as those shown at 931 and 932.

When the transducer is in use, fluid under pressure is fed from a hydraulic pump to the threaded bore 917 whence it passes through the annular passage 916 and the three restrictors to the three cavities such as 914. Fluid leaves the three cavities through the two nozzles as 920 and 921 and impinges on the surface of the magnet 918. The fluid collects in the groove 926 and is returned to the pump through the threaded bore 927.

If the currents in the three solenoids are equal, they will exert no resulting force on the magnet tending to move it and the jets of fluid from the six nozzles which are evenly distributed around this surface will tend to centralize the magnet at equal distances from all six nozzles. Thus, the resistances to the escape of fluid from the three cavities will be the same and the pressures supplied to output lines connected to the three bores such as 915 will be equal. If the three electrical input currents are unequal, a resultant force will be exerted on the magnet 918 tending to move it from its central position with the result that the resistances to the escape of fluid from the three cavities will also be unbalanced. The resulting unbalance in the output pressures will be communicated to hydraulic actuators or amplifiers by means of the output lines in the same manner as described, for example, with reference to FIGURES 1 to 6 of the accompanying drawings.

FIGURES 20 and 21 illustrate a further modification of the amplifier illustrated in FIGURES 7 and 8 in which, as in the amplifier illustrated in FIGURES 9 and 10, the balancing plate is replaced by a central balancing member. In the present embodiment, however, three composite valve spools are used as in FIGURES 7 and 8, but each spool has an additional valve piston to enable it to control a double-acting hydraulic jack.

The amplifier illustrated in FIGURES 20 and 21 includes a cylinder block 771, an upper cover 772 and a lower cover 773 and the assembly is clamped together by means of three bolts such as that shown at 774 together with co-operating nuts such as that shown at 777. To ensure that the joints between the covers and the cylinder block are fluid-tight, the mating surfaces are lapped and additional ring seals (not shown) may be provided if necessary.

The cylinder block 771 contains three cylinders 781, 782 and 783 the axes of which are contained in a single plane and intersect at the centre of the block. Valve spools 784, 785 and 786 are slidable respectively in the three cylinders and each valve spool includes a control piston and two valve pistons. Thus, the valve spool 784 includes a control piston 787 and valve pistons 788 and 789; the valve spool 785 includes a control piston 790 and valve pistons 791 and 792; and the valve spool 786 includes a control piston 793 and valve pistons 794 and 795. The cylinder block 771 also includes a central cavity 796 in which is located a central member 797 and the upper and lower surfaces of the central member 797 are lapped so that they are accurately parallel to the inner faces of the covers 772 and 773, and so that the distance between them is only very slightly less than the thickness of the cylinder block 771. The inner ends of the valve spools 784, 785 and 786 are flat and bear against the outer cylindrical surface of the central member 797.

The cylinders 781, 782 and 783 are formed by drilling the cylinder block radially inwards and the outer ends of the cylinders are thereafter closed and sealed by means of respective plugs 753, 754 and 755. Each of the cylinders is also provided with two outlet ports of the same width and the same distance apart as the two valve pistons on each valve spool. Thus, the cylinder 781 is provided with outlet ports 741 and 742; the cylinder 782 is provided with outlet ports 743 and 744, and the cylinder 783 is provided with outlet ports 745 and 746.

The upper cover 772 is provided with three threaded bores such as that shown at 747 each of which communicates through a drilling such as that shown at 748 with the outer end of a respective one of the three cylinders. The upper cover is also provided with a threaded bore 749 which communicates with the central space 796 in the cylinder block. The central space 796 also communicates with each of the cylinders through a slot 730, an annular groove 731 and three drillings such as that shown at 732. Finally, the upper cover is provided with a threaded bore 750 which communicates through an annular groove 756 with three drillings such as that shown at 757 each of which communicates with the space between the two circumferential grooves in a respective one of the cylinders.

The lower cover 773 is provided with three threaded bores such as that shown at 758 which communicates with the outlet port 741 and three threaded bores such as that shown at 759 which communicates with the outlet port 742.

When the amplifier is in use, fluid under pressure is fed from a hydraulic pump to the threaded bore 750 whence it passes through the annular groove 756 to a space in each of the cylinders located between the two valve spools. Each of the threaded bores such as that shown at 747 is connected by means of a hydraulic line to a source of control pressure which may, for example, be a respective one of the output ports of the transducer illustrated in FIGURES 1 to 6. Each of the threaded bores such as that shown at 758 is connected to one end of the cylinder of a respective one of three hydraulic jacks and each of the three bores such as that shown at 759 is connected to the other end of the cylinder of the associated hydraulic jack. The three jacks may be used, for example, to control the position of a platform. The threaded bore 749 is connected to the return path of the hydraulic system.

When the three control pressures are equal, there will be no resultant force on the central member 797 tending to move it in any radial direction. Similarly, the pump pressure applied to the annular passage 756 acts equally on the two valve pistons of each valve spool and, accordingly, does not apply any force tending to move the valve spool along its cylinder. As previously described, therefore, springs may be provided in three cylinders if the amplifier is being uesd in an open-loop servo system. When the member 797 is located in a central position between the three cylinders either as the result of the action of the springs, if provided, or as a result of control pressures generated by the feedback of a closed-loop servo system, the three valve spools will be located in the position shown for the spool 784 in FIGURE 20. Thus, under these conditions, both the outlet ports in each of the cylinders will be symmetrically covered by the two valve pistons and the pressures in all the output lines to the hydraulic jacks will be balanced.

When the control pressures are unbalanced, at least one of the valve spools will be moved radially inwards and at least one of the two other valve spools will be moved radially outwards. If it is assumed, for example, that the valve spool 784 is moved inwards, then the port 741 will be placed in communication through the passages 732, 731 and 730 with the return line of the system, whereas the port 742 will be placed in communication with the high pressure side of the pump through the passages 757 and 756. On the other hand, if the valve spool 784 is assumed to be moved outwards, the port 741 will be placed in communication with the high pressure side of the pump through the passages 757 and 756, whereas the port 742 will be placed in communication with the return side of the system through the central space 796. Co-operation between the inner ends of the stems of the three valve spools and the central member 797 will ensure that the displacements of the three valve spools arc vectorially related in accordance with the geometrical arrangement of the three cylinders.

Figure 22:
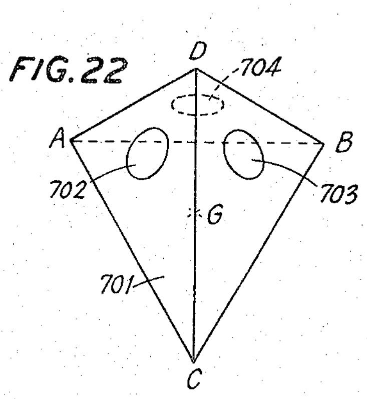
FIGURE 22 is a perspective view of a sensor in accordance with the invention.
Figure 23:
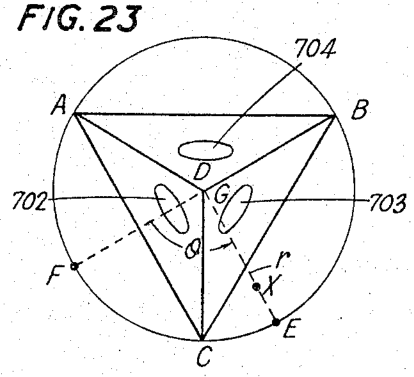
FIGURE 23 is a plan view of the sensor illustrated in FIGURE 22.

FIGURES 22 and 23 illustrate a sensor in accordance with the invention which is designed to provide three electrical outputs for application to a transducer of the kind illustrated in FIGURES 1 to 6, 16, or 17 and 18.

The sensor illustrated includes a block 701 consisting, for example, of a synthetic resin material. The block 701 is the shape of a regular triangular pyramid, the apex being indicated by the letter D and the base being indicated by the letters A, B and C. Mounted on each of the side faces of the pyramid is a sensitive device having a flat sensing surface so that its output is a function of the intensity of the energy to which it is sensitive and therefore of the angle of incidence of such energy. The energy may be, for example, light or sound and each device may be, for example, a cadmium sulphide photo-electric cell. The three sensitive devices are shown at 702, 703 and 704 and it will be assumed hereinafter that they are photo-electric cells.

If a light source is placed vertically above the apex of the pyramid (i.e. immediately above the point D as shown in the plan view of FIGURE 23), all three photo-electric cells will be equally illuminated and accordingly produce equal output voltages. If, however, the light source is displaced from the vertical axis of the pyramid, the three cells will no longer be equally illuminated. If the position of the centre of the light source is projected on to the plane containing the base of the pyramid, its position may be defined by polar co-ordinates in this plane. Thus, for example, if a line GF passing from the centre of the base of the pyramid and bisecting the line AC, is taken as a reference, the position of a point X, the projection of which on the plane of the base of the pyramid lies on a line DE, may be defined by the length $r$ from the centre G of the base of the pyramid to the projection of the point X and the angle $\theta$ between the lines GF and GE. Provided the apex angle of the pyramid is not large, and neglecting terms of a second order of magnitude, it can be shown that there will be a range of values of displacement of the light source over which the voltages from the three cells 702, 703 and 704 will be vectorially related by the expressions $r. \cos \theta$, $-r. \cos (60°+\theta)$ and $-r. \cos (60°-\theta)$. Therefore with the particular configuration shown in FIGURES 22 and 23, the sensor provides electrical output signals related in the same manner as the pneumatic output signals from the transducer illustrated in FIGURES 1 to 6. If the expressions for the output signals are derived rigorously, it will be seen that they are dependent on the apex angle of the pyramid as well as on the angle of incidence of the light. From these expressions a sensor can be designed to produce the required relationships between the electrical output signals.

Figure 24:
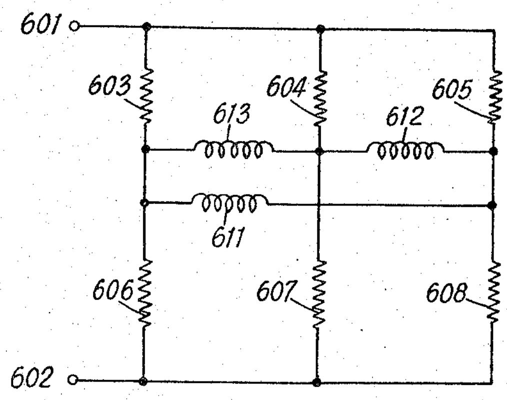
FIGURE 24 is a circuit diagram of a hexahedral bridge in accordance with the invention.

The three sensitive devices are preferably connected to the coils of the transducer by means of a bridge circuit of the kind illustrated in FIGURE 24. It has already been stated that the input currents to a transducer in accordance with the invention should preferably be arranged so that their vector sum is zero. Clearly this cannot be achieved under all circumstances unless the directions of all the currents are capable of being reversed. A bridge circuit of the kind illustrated in FIGURE 24 operates to ensure that the current in each coil will depend on the difference in the outputs of two of the photo-electric cells, so that the direction of the current can vary with the sense of the difference. This may be a difference of voltage if, for example, photo-voltaic cells are used or it may be a difference of resistance if photo-resistive cells are used. The particular circuit shown is suitable for use with either active or passive cells, but it will be assumed that it is to be used with passive (i.e. photo-resistive) cells. These cells are represented in the drawing by the three resistors 606, 607 and 608. The three coils of the transducer are shown at 609, 610 and 611 and the circuit is completed by three fixed resistors 603, 604 and 605. The terminals 601 and 602 represent connections to a battery or other source of electric current. It will be seen that the three photo cells 606, 607 and 608 are connected across the battery in series with respective resistors 603, 604 and 605 and that each coil is connected between the junctions of two of the photo cells with their respective series resistors. When the resistances of any two of the cells are equal there will be no current through the coil connected to those two cells, but current will flow through any coil connected between two cells having different resistances. It will be seen that the space symmetrical arrangement of the circuit ensures that if related changes are produced in the resistances of the three photo cells, similarly related changes will be produced in the currents through the three coils.

Normally, the outputs from the three photo-electric cells in a sensor as illustrated in FIGURES 22 and 23 will be insufficient to operate a transducer, for example, of the kind illustrated in FIGURES 1 to 6 and, in this case, the electric currents must be amplified before being used to operate a transducer. In order to maintain the desired vectorial relationship between the three currents, it is desirable that they should be amplified by means of a single amplifier having three-dimensional symmetry so that it is equivalent to the bridge circuit illustrated in FIGURE 24. One convenient form of such a space-symmetrical amplifier for use with photo-resistive cells is illustrated in FIGURE 25.

Figure 25:
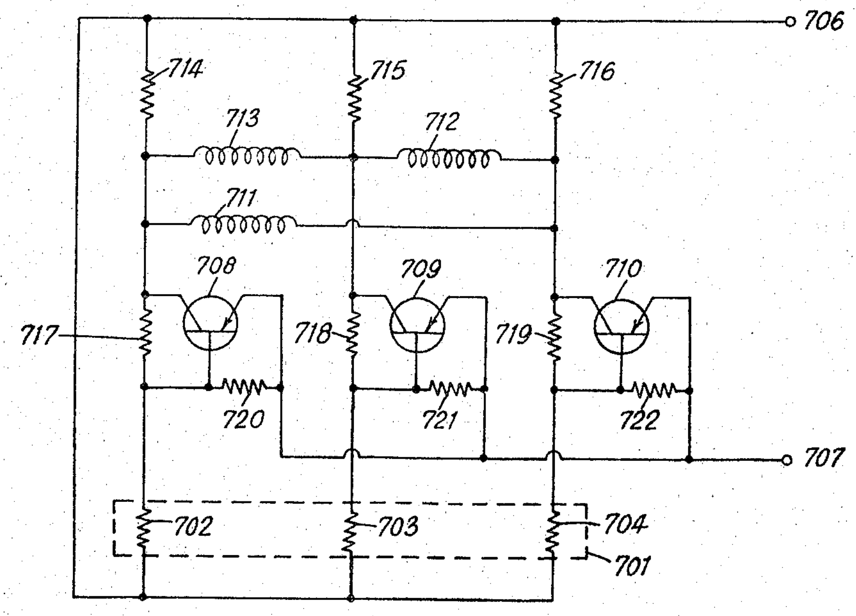
FIGURE 25 is a circuit diagram of a transistor-amplifier having three-dimensional symmetry in accordance with the invention.

In FIGURE 25, the three sensors are again designated by the reference numerals 702, 703 and 704 and one terminal of each of the cells is shown connected to the negative terminal 706 of a battery, the positive terminal of which is connected to a terminal 707. The other terminal of each of the photo-electric cells is connected to the base electrode of a respective one of three transistors 708, 709 and 710. The emitters of the three transistors are connected to the terminal 707 and the collectors are connected to three coils 711, 712 and 713 which may, for example, be the three coils such as illustrated at 55 in the transducer illustrated in FIGURES 1 to 6. It will be seen that the coil 711 is connected between the collectors of the transistors 708 and 710, that the coil 712 is connected between the collectors of the transistors 709 and 710 and that the coil 713 is connected between the collectors of the transistors 708 and 709. The collectors of the three transistors 708, 709 and 710 are also connected to the terminal 716 through three respective resistors 714, 715 and 716. Further a respective one of three resistors 717, 718 and 719 is connected between the base and collector electrodes of each of the transistors and a respective one of resistors 720, 721 and 722 is connected between the base and emitter electrodes of each transistor.

It will be seen that the amplifier illustrated in FIGURE 25 has the same basic configuration as the bridge circuit illustrated in FIGURE 24. Thus, the three resistors 714, 715 and 716 in FIGURE 25 are equivalent to the three resistors 603, 604 and 605 in FIGURE 24, and the three coils 713, 712 and 711 are equivalent to the three coils 613, 612 and 611. Further, each of the transistors illustrated in FIGURE 25, together with its associated bias resistors and photo-electric cell, may be regarded as equivalent to one of the sensitive cells illustrated in FIGURE 24. Thus, the transistor circuit illustrated in FIGURE 25 maintains the advantages of the space-symmetrical bridge arrangement illustrated in FIGURE 24.

The circuit shown may be adapted for use with active (i.e. photo-voltaic) cells by omitting the return lead from the common terminals of the photo-electric cells to the terminal 706. The circuit of FIGURE 25 is illustrated with three photo cells connected to a common point and with the three coils connected in a triangular circuit. However, it is to be understood that the circuit may be modified by connecting the active sensitive devices in a triangular circuit. Also, if desired, the coils may be connected between the three respective collectors and a common point.

It has already been explained that the outputs from a transducer or amplifier in accordance with the invention may be utilised to control the pressures in three hydraulic cylinders the pistons of which control the angular position of a platform. However, a particularly convenient way of controlling a platform in response to the pressures in three hydraulic lines is illustrated in FIGURE 26.

Figure 26:
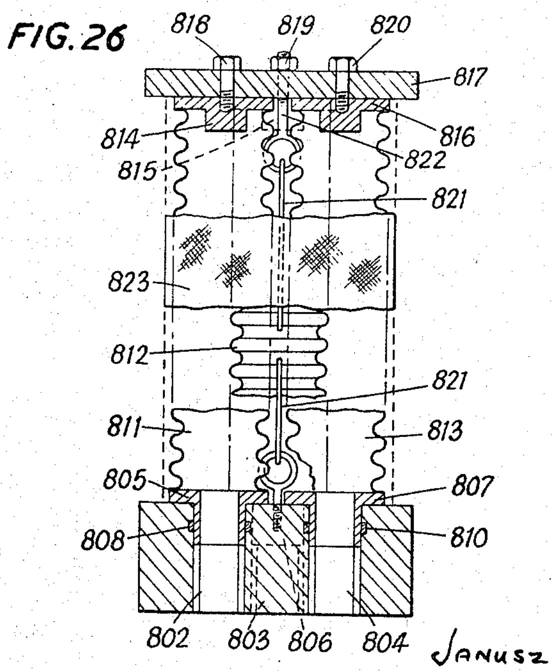
FIGURE 26 is a sectional side elevation of a hydraulic or pneumatic actuator in accordance with the invention.

The actuator illustrated in FIGURE 26 includes a base 801 having therein three bores 802, 803 and 804 adapted to receive the output lines from a transducer or amplifier in accordance with the invention. Three plugs 805, 806 and 807 are screwed into the upper ends of the three bores and are sealed by means of three O-rings 808, 809 and 810. Sealed to each of the three plugs 805, 806 and 807 is the lower end of a respective one of three bellows 811, 812 and 813. The upper end of each of the bellows is sealed by a respective one of three further plugs 814, 815 and 816. The three further plugs are secured to a platform 817 by means of three bolts 818, 819 and 820.

Joining the centres of the base 801 and the plate 817 is a flexible cord 821 which is secured to the platform 817, for example, by means of a bolt 822 and to the base by means of a bolt 823. The three bellows are enclosed in a braided tube 823.

In operation, when the pressures applied to the three bores 802, 803 and 804 are equal, the platform 817 will be maintained parallel to the base 801 at a distance determined by the wire 821. If the pressures are unbalanced but are related in the manner described above so that the pressure in at least one of the bellows is increased and the pressure in at least one of the other bellows is decreased, the platform 817 will be tilted at an angle, and in a plane, uniquely determined by the three input pressures. The actuator illustrated differs from a platform supported by three hydraulic jacks in that, when the platform 817 tilts the longitudinal axes of the bellows, will become curved, as also will the axis of the tube 823. Thus, the platform will not merely tilt, but will be moved translationally as well as angularly.

What I claim as my invention and desire to secure by Letters Patent of the United States is:

1. In a data transmission system a transducer comprising a cylindrical member provided with three generally cylindrical cavities, the axes of which are parallel to the axis of said cylindrical member, and each of which extends from a respective outlet port in one end face of the cylindrical member to a respective control orifice in the other end face of the cylindrical member, means for supplying fluid under pressure to said three cavities, and a modulator plate co-operating with said control orifices to vary the flow of fluid under pressure therefrom, said modulator plate being mounted for pivotal movement with two degrees of freedom.

2. In a data transmission system a transducer comprising a block having at least one flat surface and provided with three cavities each of which extends from a respective outlet port to a respective control orifice in said flat surface, means for supplying fluid under pressure to said three cavities, and a modulator plate co-operating with said control orifices to vary the flow of fluid under pressure therefrom, said modulator plate being mounted for pivotal movement with two degrees of freedom about a universal pivot located between said control orfices.

3. In a data tranmission system a tranducer comprising a cylindrical member having therein a central cylindrical cavity and three further cylindrical cavities, the axes of which are parallel to the axis of said central cylindrical cavity, each of said further cavities extending from a respective outlet port in one end face of the cylindrical member to a respective inlet port in the other end face of the cylindrical member and being in communication with at least one control orifice located in said central cavity, a modulator member of magnetizeable material located in said central cavity and adapted to co-operate with said control orifices, and electromagnetic means for effecting movement of said modulator member in relation to said orifices.

4. A data transmission system comprising a transducer and an amplifier, wherein the transducer comprises a cylindrical member having therein a central cavity and three further cavities, distributed around the central cavity, each of said further cavities extending from a respective outlet port in one end face of the cylindrical member to a respective inlet port in the other end face of the cylindrical member and being in communication with at least one control orifice located in said central cavity, a modulator member located in said central cavity and adapted to co-operate with said control orifices, and electromagnetic means for applying forces to said modulator member tending to vary the position of said modulator member in relation to said orifices, and wherein the amplifier comprises first, second and third pistons having their axes contained in one plane and intersecting at a single point and each slidable in a respective cylinder provided with a control port, means for coupling the control port of each of said cylinders to the outlet port of a respective one of the three further cavities in the transducer and a displaceable member co-operating with said pistons in such a way that it ensures that the displacement of the first piston is proportional to $r.\cos(a-\theta)$, the displacement of the second piston is proportional to $r.\cos(b-\theta)$, and the displacement of the third piston is proportional to $r.\cos(c-\theta)$, $r$ and $\theta$ being variable quantities determined by the position of the modulator member in the transducer and $a$, $b$ and $c$ being angular constants.

5. A data transmission system comprising a transducer and an amplifier, where the transducer comprises a body member having therein a central cylindrical cavity and three further cavities, two of which are located on one side of a plane containing the axis of said central cylindrical cavity, and the third of which is located on the other side of said plane, each of said further cavities extending from a respective outlet port in one end face of the body member to a respective inlet port in the other end face of the body member and being in communication with at least one control orifice located in said central cavity, a modulator member of magnetizeable material located in said central cavity and adapted to co-operate with said control orifices, and electromagnetic means for applying forces to said modulator member tending to vary the position of said modulator member in relation to said orifices, and wherein the amplifier comprises, first, second and third pistons having their axes contained in one plane and intersecting at a single point and each slidable in a respective cylinder provided with a control port, means for coupling the control port of each of said cylinders to the outlet port of a respective one of the cylindrical cavities in the transducer and a displaceable member co-operating with said pistons in such a way that it ensures that the rate of displacement of the first piston is proportional to $r.\cos(a-\theta)$, the rate of displacement of the second piston is proportional to $r.\cos(b-\theta)$, and the rate of displacement of the third piston is proportional to $r.\cos(c-\theta)$ $r$ and $\theta$ being variable quantities determined by the forces applied to the modulator member in the transducer and $a$, $b$ and $c$ being constants.

6. A data transmission system comprising a transducer and an amplifier, wherein the transducer comprises a cylindrical member containing a central cylindrical cavity and first, second and third further cylindrical cavities the axes of which are parallel to the axis of said central cavity, each of said further cavities extending from a respective outlet port in one end face of the cylindrical member to an inlet port in the other end face of the cylindrical member, means coupling said first, second and third further cavities respectively with first, second and third control orifices located in said central cavity, the angle between a reference plane containing the axis of the central cavity and a first further plane containing the axis of the central cavity and the centre of said first control orifice being $a$, the angle between the said reference plane and a second further plane containing the axis of the central cavity and the centre of said second control orifice being $b$, and the angle between said reference plane and a third further plane containing the axis of the central cavity and the centre of said third control orifice being $c$, and a modulator member located in said central cavity and adapted to provide variable obstruction of said control orifices, and wherein the amplifier comprises first, second and third pistons each slidable in a respective cylinder provided with an inlet port, said pistons and cylinders having their axes contained in one plane and intersecting at a single point, the angle between a reference line and the axis of said first piston being $a$, the angle between said reference line and the axis of said second piston being $b$, and the angle between said reference line and the axis of said third piston being $c$, means coupling the outlet port of each of the three further cylindrical cavities of the transducer to a respective control port in said amplifier and a displaceable member co-operating with said pistons in such a way that it ensures that the displacement of the first piston is proportional to $r.\cos(a-\theta)$, that the displacement of the second piston is proportional to $r.\cos(b-\theta)$, and that the displacement of the third piston is proportional to $r.\cos(c-\theta)$, $r$ and $\theta$ being variable quantities determined by the position of said modulator in the central cavity of the transducer.

7. An electro-hydraulic transducer comprising means for defining three cavities, three nozzles each communicating with a respective one of said cavities, three restrictors each associated with a respective one of said cavities, means connecting each of said cavities to a respective outlet, means for connecting a supply of fluid under pressure to each cavity through its associated restrictor, a modulator plate mounted for pivotal movement with two degrees of freedom said modulator plate being adapted to control the flow of fluid from said nozzles, a permanent magnet secured to said modulator plate, and electromagnetic means for applying forces in at least two mutually perpenicular directions to said permanent magnet in response to electric control currents.

8. A hydraulic amplifier comprising a plurality of spool valves each including a stem, a control piston and at least one valve piston, and each being slidable in a respective cylinder, a balancing plate mounted with two degrees of freedom and corporating with the stem of said spool valves, means for supplying a control pressure to each of said control pistons, and means for selectively connecting fluid under pressure and a hydraulic return to a plurality of outlets in dependence on the positions of said valve pistons in their respective cylinders.

9. A hydraulic amplifier comprising a plurality of control pistons and a plurality of valve pistons, each of said control and valve pistons being slidable in a respective cylinder and the axes of all said pistons being contained in a single plane and intersecting in a central point, a cetral member co-operating with the inner ends of said pistons and movable in any direction in said plane, means for supplying a control pressure to each of said control pistons, and means for selectively connecting fluid under pressure and a hydraulic return to a plurality of outlets in dependence on the positions of said valve pistons in their respective cylinders.

10. A hydraulic amplifier comprising a plurality of control pistons and a plurality of valve pistons, each of said control and valve pistons being slidable in a respective cylinder and the axes of all said pistons being contained in a single plane and intersecting in a central point, a ring co-operating with the outer ends of said pistons and movable in any direction in said plane, means for supplying a control pressure to each of said control pistons, and means for selectively connecting fluid under pressure and a hydraulic return to a plurality of outlets in dependence on the positions of said valve pistons in their respective cylinders.

11. A hydraulic amplifier comprising a plurality of pistons each slidable in a respective one of a like plurality of cylinders, the axes of which intersect in a central point and are contained in a single plane, means for supplying a control pressure to each of said pistons, and an annular member movable in any direction in said plane under the control of said pistons, wherein said annular member co-operates with a pressure inlet port, a return port, and a plurality of outlet ports to selectively connect the outlet ports to the pressure inlet port and the return port.

12. An electro-hydraulic transducer comprising a capillary jet tube, means for supplying fluid under pressure to said tube, three receivers symmetrically arranged around the longitudinal axis of said jet tube and adapted to receive fluid from said tube, and electromagnetic control means for deflecting said tube from a central position in which it charges all the receivers equally in any direction perpendicular to its longitudinal axis.

13. An electro-hydraulic transducer comprising means for defining a plurality of cavities, a plurality of nozzles each communicating with a respective one of said cavities, a plurality of restrictors each associated with a respective one of said cavities, means connecting each of said cavities to a respective outlet, means for connecting a supply of fluid under pressure to each cavity through its associated restrictor, a ring of magnetic material, a plurality of extension members secured to said ring and each adapted to control the flow of fluid from one of said nozzles, and electromagnetic means for displacing said ring from a rest position in which the extension members are all equidistant from their respective nozzles.

14. A transducer as claimed in claim 13, in which said electromagnetic means include three solenoids through which said ring passes, a permanent magnet, and pole pieces adapted to conduct magnetic flux from said permanent magnet to said ring.

15. In a data transmission system a transducer comprising a cylindrical member containing three cylindrical cavities each of which extends from a respective outlet port in one end face of the cylindrical member to a respective inlet port in the other end face of the cylindrical member and each of which is in communication with a respective pair of control orifices located in a fourth cavity in said cylindrical member between said three cavities and a modulator member located in said fourth cavity and mounted for pivotal movement with two degrees of freedom to provide variable obstruction of said control orifices.

16. A transducer comprising first, second and third cavities each having inlet, outlet and control ports, means for supplying fluid under pressure to the inlet port of each of said cavities, a single universally mounted modulator arranged symmetrically with respect to the control ports of said cavities, means for moving said modulator from a rest position, in which it obstructs all said control ports equally, by an amount defined by an input quantity $r$ and in a direction defined by an input quantity $\theta$ to an operative position in which the degree of obstruction of the first cavity control port is proportional to $r. \cos [a-\theta]$, the degree of obstruction of the second cavity control port is proportional to $r. \cos [b-\theta]$, and the degree of obstruction of the third cavity control port is proportional to $r. \cos [c-\theta]$, $a$, $b$ and $c$ being angular constants determined by the angular relationship between said control ports.

17. A transducer comprising a cylindrical member having therein a central cavity and three further cavities, distributed around the central cavity, each of said further cavities extending from a respective outlet port in one end face of the cylindrical member to a respective inlet port in the other end face of the cylindrical member and being in communication with at least one control orifice located in said central cavity, a modulator member located in said central cavity and adapted to cooperate with said control orifices, and electromagnetic means for applying forces to said modulator member tending to vary the position of said modulator member in relation to said orifices, so that it causes the pressure in one of said further cavities to vary in proportion to $r. \cos [a-\theta]$, the pressure in a second one of said further cavities to vary in proportion to $r. \cos [b-\theta]$, and the pressure in a third one of said further cavities to vary in proportion to $r. \cos [c-\theta]$, $r$ and $\theta$ being variable quantities determined by the instantaneous position of the modulator member in relation to the orifices and $a$, $b$ and $c$ being angular constants determined by the angular location of the orifices in the central cavity.

18. A transducer comprising a body member having therein a central cylindrical cavity and three further cavities, two of which are located on one side of a plane containing the axis of said central cylindrical cavity, and the third of which is located on the other side of said plane, each of said further cavities extending from a respective outlet port in one end face of the body member to a respective inlet port in the other end face of the body member and being in communication with at least one control orifice located in said central cavity, a modulator member of magnetizable material located in said central cavity and adapted to cooperate with said control orifices, and electromagnetic means for applying forces to said modulator member tending to vary the position of said modulator member in relation to said orifices.

19. A transducer comprising a cylindrical member containing a central cylindrical cavity and first, second and third further cylindrical cavities the axes of which are parallel to the axis of said central cavity, each of said further cavities extending from a respective outlet port in one end face of the cylindrical member to an inlet port in the other end face of the cylindrical member, means coupling said first, second and third further cavities respectively with first, second and third control orifices located in said central cavity, the angle between a reference plane containing the axis of the central cavity and a first further plane containing the axis of the central cavity and the centre of said first control orifice being $a$, the angle between said reference plane and a second further plane containing the axis of the central cavity and the centre of said second control orifice being $b$, and the angle between said reference plane and a third further plane containing the axis of the central cavity and the centre of said third control orifice being $c$, and a modulator member located in said central cavity and adapted to provide variable obstruction of said control orifices, so that it causes the pressure in the first further cavity to vary in proportion to $r.\cos[a-\theta]$, the pressure in the second further cavity to vary in proportion to $r.\cos[b-\theta]$, and the pressure in the third further cavity to vary in proportion to $r.\cos[c-\theta]$, $r$ and $\theta$ being variable quantities determined by the instantaneous position of said modulator in the central cavity of the transducer.

References Cited

UNITED STATES PATENTS

| | | | |
|---|---|---|---|
| 2,228,015 | 1/1941 | Neukirch | 137—81.5 |
| 2,247,301 | 6/1941 | Lesser | 137—81.5 |
| 2,853,090 | 9/1958 | Hanna et al. | 137—82 |
| 2,878,786 | 3/1959 | Vuillemin | 91—413 |
| 2,945,478 | 7/1960 | Hanna | 91—51 |
| 3,024,809 | 3/1962 | Shafer | 137—596.18 |
| 3,044,480 | 7/1962 | Shih-Ying Lee | 137—82 |
| 3,071,154 | 1/1963 | Cargill et al. | 137—81.5 |
| 3,072,146 | 1/1963 | Gizeski | 235—200 |
| 3,082,781 | 3/1963 | Moosmann | 235—200 |
| 3,090,395 | 5/1963 | Weiss et al. | 137—86 |
| 3,182,686 | 5/1965 | Zilberfarb | 137—81.5 |
| 3,183,929 | 5/1965 | Weaver | 137—596.18 |
| 3,211,165 | 10/1965 | Jansson | 137—86 |

MARTIN P. SCHWADRON, *Primary Examiner.*

B. L. ADAMS, *Assistant Examiner.*